United States Patent
Nishiwaki et al.

[11] Patent Number: 5,921,884
[45] Date of Patent: Jul. 13, 1999

[54] CONTROL SYSTEM FOR AUTOMATIC TRANSMISSION

[75] Inventors: Jiro Nishiwaki; Mitsuhiko Ando; Takahiro Yamashita, all of Anjo, Japan

[73] Assignee: Aisin Aw Co., Ltd., Japan

[21] Appl. No.: 08/923,641

[22] Filed: Sep. 4, 1997

[30] Foreign Application Priority Data

Sep. 30, 1996 [JP] Japan .................................. 8-258883

[51] Int. Cl.$^6$ .................................................. F16H 61/20
[52] U.S. Cl. .................................................. 477/61; 475/63
[58] Field of Search .............................. 477/61; 475/62, 475/63, 61

[56] References Cited

U.S. PATENT DOCUMENTS

| | | | |
|---|---|---|---|
| 3,662,621 | 5/1972 | Hirozawa | 475/63 |
| 4,651,593 | 3/1987 | Aoki et al. | 475/62 X |
| 4,730,708 | 3/1988 | Hamano et al. | 477/114 |
| 4,775,938 | 10/1988 | Hiramatsu | 477/114 X |
| 5,272,630 | 12/1993 | Brown et al. | 477/121 X |
| 5,542,887 | 8/1996 | Tsukamoto et al. | 475/63 |
| 5,653,660 | 8/1997 | Tsukamoto et al. | 477/143 |
| 5,769,753 | 6/1998 | Kusafuka et al. | 477/116 |

FOREIGN PATENT DOCUMENTS 60-220260 2/1985 Japan .

*Primary Examiner*—Charles A. Marmor
*Assistant Examiner*—Scott Lund
*Attorney, Agent, or Firm*—Lorusso & Loud

[57] ABSTRACT

A control system for an automatic transmission includes a clutch for transmitting the rotation of a fluid transmission unit to a speed change mechanism of a transmission and a hydraulic servo for applying/releasing the clutch. A stop state detector is provided for detecting the stop state of the vehicle. A release control oil pressure changer lowers the oil pressure of the hydraulic servo by a first set pressure when the vehicle stop state is detected. An in-neutral control oil pressure changer raises the oil pressure of the hydraulic servo by a second set pressure, when the difference between the input side RPM and the output side RPM of the fluid transmission unit has not changed, and lowers the same by a third set pressure when the rotational speed difference has changed. The first set pressure is different from the second and third set pressures.

5 Claims, 18 Drawing Sheets

FIG. 3

|   |   | Solenoids | | | Clutches | | | Brakes | | | | One-Way Clutches | | |
|---|---|---|---|---|---|---|---|---|---|---|---|---|---|---|
|   |   | S1 | S2 | S3 | C1 | C2 | C3 | B1 | B2 | B3 | B4 | F1 | F2 | F3 |
|   | R | × | ○ | × | × | ○ | × | × | × | ○ | ○ | × | × | × |
|   | N | × | ○ | × | × | × | × | × | × | × | ○ | × | × | × |
| D | 1 ST | × | ○ | △ | ○ | × | × | × | × | ○ | ○ | × | ○ | ○ |
|   | 2 ND | ○ | ○ | △ | ○ | × | × | ○ | ○ | × | ○ | ○ | × | ○ |
|   | 3 RD | ○ | × | × | ○ | × | ○ | ○ | ○ | × | × | ○ | × | × |
|   | 4 TH | × | × | × | ○ | ○ | ○ | × | ○ | × | × | × | × | × |

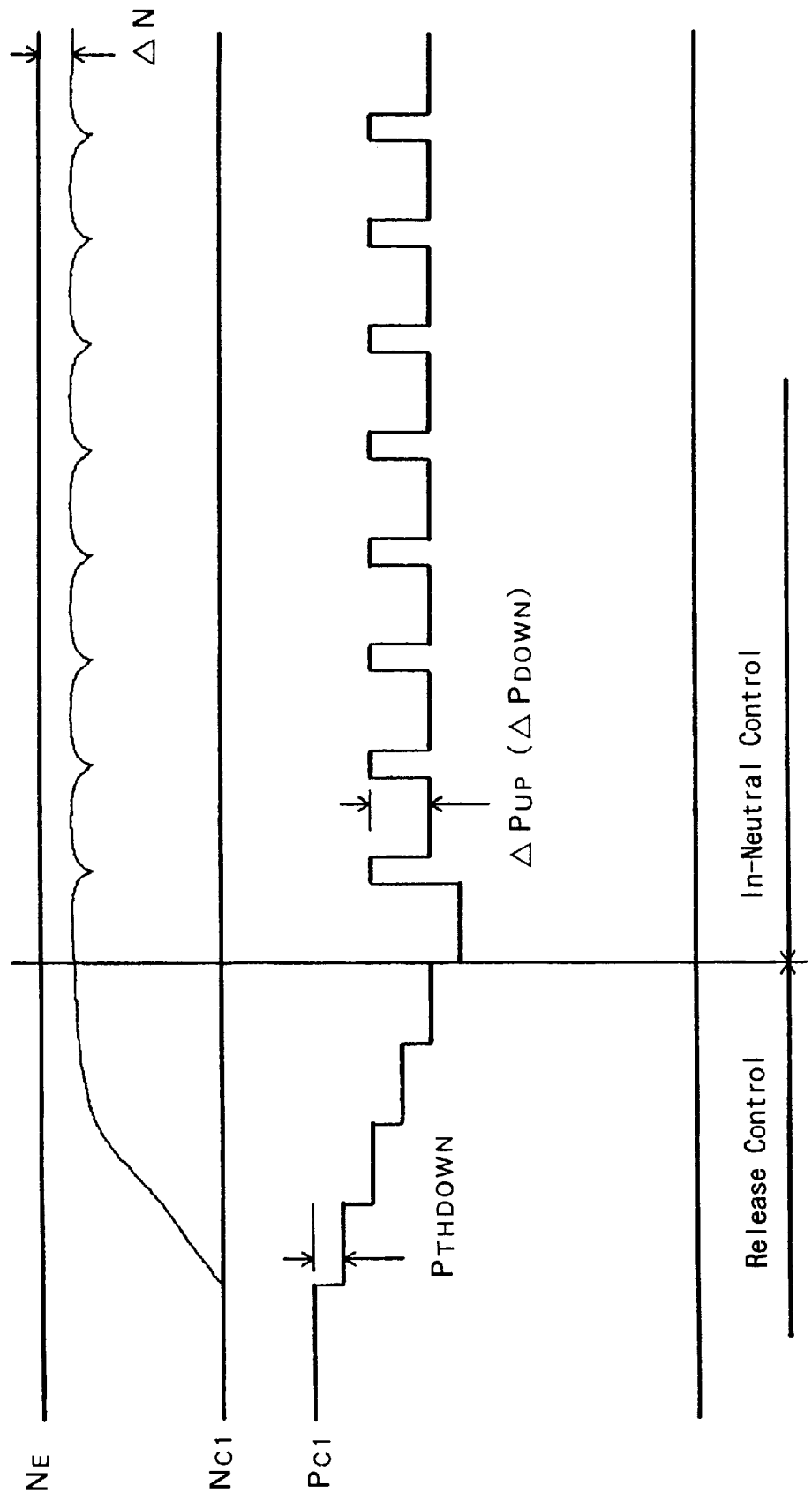

CONTROL SYSTEM FOR AUTOMATIC TRANSMISSION

BACKGROUND OF THE INVENTION

1. Field of the Invention

The invention relates to a control system for an automatic transmission.

2. Related Art

In the automatic transmission of the prior art, rotation generated by the engine is transmitted through a fluid transmission unit such as a torque converter to a speed change unit so that a speed change may be effected in the speed change unit. Between the fluid transmission unit and the speed change unit, moreover, there is arranged a first clutch (or an input clutch) which can be applied and released to interchange ranges between a neutral range (hereinafter "N-range") and a forward running range (hereinafter "D-range").

In an automatic transmission, moreover, neutral control is executed when the vehicle is stopped with the D-range being selected, to place the first clutch in the state which immediately precedes the start of its application, so that in starting forward movement of the vehicle the load applied to the engine may be reduced to improve the fuel economy while preventing shock.

In neutral control, the neutral state of the first clutch is established by raising/lowering the oil pressure fed to the hydraulic servo of the first clutch, stepwise with a predetermined oil pressure increment in a manner to correspond to the change in the difference between the input side RPM and the output side RPM of the fluid transmission unit, e.g. a torque converter. Also executed (as disclosed in Japanese Patent Laid-Open No. 293687/1995) are: a release control for establishing the neutral control by lowering the oil pressure in the hydraulic servo, gradually, from the state in which the first clutch is applied; and an in-neutral control for maintaining the neutral control.

However, the automatic transmission control system of the prior art described above has failed to provide for stable execution of the release control and the in-neutral control.

If the oil pressure increment (of change) is enlarged in the case of a fluid transmission unit having a large stall coefficient and a high stall torque, the rotational speed difference becomes so excessive that the first clutch is released too much to allow the release control to stabilize.

If, on the other hand the oil pressure increment is reduced, the rotational speed difference (between fluid transmission input and output) is reduced to prevent the excessive release of the first clutch in the release control. However, at a low oil temperature, the rotational speed difference is so small that the first clutch cannot be returned to the state which immediately precedes the start of its application and stable in-neutral control cannot be provided.

SUMMARY OF THE INVENTION

The present invention has as its objective provision of a control system for an automatic transmission, which control system provides stable release control and in-neutral control by solving the aforementioned problems of the prior art automatic transmission control systems.

Accordingly, the present invention provides a control system for an automatic transmission, including: a fluid transmission unit for transmitting the rotation of an engine to a speed change unit; a clutch which is applied, responsive to selection of a forward running range, for transmitting the rotation of the fluid transmission unit to a speed change mechanism of the speed change unit; a hydraulic servo for applying/releasing the clutch; a stop state detector for detecting a vehicle stop state with the forward running range selected, wherein the throttle is fully closed, the brake pedal is depressed and the vehicle speed is substantially zero; an input side RPM detector for detecting the input side RPM of the fluid transmission unit; an output side RPM detector for detecting the output side RPM of the fluid transmission unit; and a control unit.

The control unit includes: a release control oil pressure changer for lowering the oil pressure of the hydraulic servo by a first set pressure increment when the vehicle stop state is detected by the stop state detector; a rotational speed difference calculator for calculating the rotational speed difference between the input side RPM and the output side RPM; a rotational difference change decider for deciding at each set time interval whether or not the rotational speed difference calculated by the rotational difference calculator has changed; and an in-neutral control oil pressure changer for raising the oil pressure of the hydraulic servo by a second set pressure increment, when the rotational speed difference has not changed, and for lowering the oil pressure of the hydraulic servo by a third set pressure increment when the rotational speed difference has changed.

In one embodiment the first set pressure increment of change is different from the second and third set pressure increments.

When the vehicular stop state is detected by the stop state detector, the oil pressure of the hydraulic servo is lowered by the first set pressure increment to effect the release control.

Moreover, the rotational difference between the input side RPM and the output side RPM is calculated so that the oil pressure of the hydraulic servo is raised by the second set pressure increment, when the rotational speed difference has not changed, but lowered by the third set pressure increment, when the rotational speed difference has changed, to thereby effect in-neutral control.

In another embodiment of the invention, the second and third set pressure increments are larger than the first set pressure increment. In this modification, the clutch is not excessively released so that the release control can be stabilized independently of the stall capacity coefficient of the fluid transmission unit. Moreover, the value of the rotational speed difference in the in-neutral control can be stabilized to return the clutch to the state which immediately precedes its application so that the in-neutral control can be stabilized independently of the stall capacity coefficient of the fluid transmission unit.

In still another embodiment of the invention, the second set pressure increment and the third set pressure increment are set to different values. In this modification, in the in-neutral control, the oil pressure increments are different for raising and lowering the pressure. As a result, the clutch can be returned to the state which immediately precedes its application so that the in-neutral control can be stabilized independently of the stall capacity coefficient of the fluid transmission unit.

In a further embodiment of the invention, the second set pressure increment is greater than the third set pressure increment. In the in-neutral control, the oil pressure increment for raising the oil pressure of the hydraulic servo is increased when the rotational difference has not changed, and the oil pressure increment for lowering the oil pressure of the hydraulic servo is reduced when the rotational difference changes. As a result, the clutch can be reliably returned to the state which immediately precedes its application, so that the in-neutral control can be stabilized independently of the stall capacity coefficient of the fluid transmission unit.

In yet another embodiment of the invention, the second and third set pressure increments of change are set to correspond to the oil temperature. By adoption of this modification, the responsiveness of the change in the rotational speed difference to the change in the oil pressure can be improved.

BRIEF DESCRIPTION OF THE DRAWINGS

FIG. 3 is a diagram tabulating the operations of the automatic transmission of FIG. 2 under control of the control system of FIG. 1;

FIG. 21 is a waveform diagram of engine RPM, clutch input side RPM and C-1 oil pressure under release control and in-neutral control in accordance with an embodiment of the present invention.

DESCRIPTION OF THE PREFERRED EMBODIMENT

A preferred embodiment of the present invention will now be described in detail with reference to the accompanying drawings.

Figure 1:
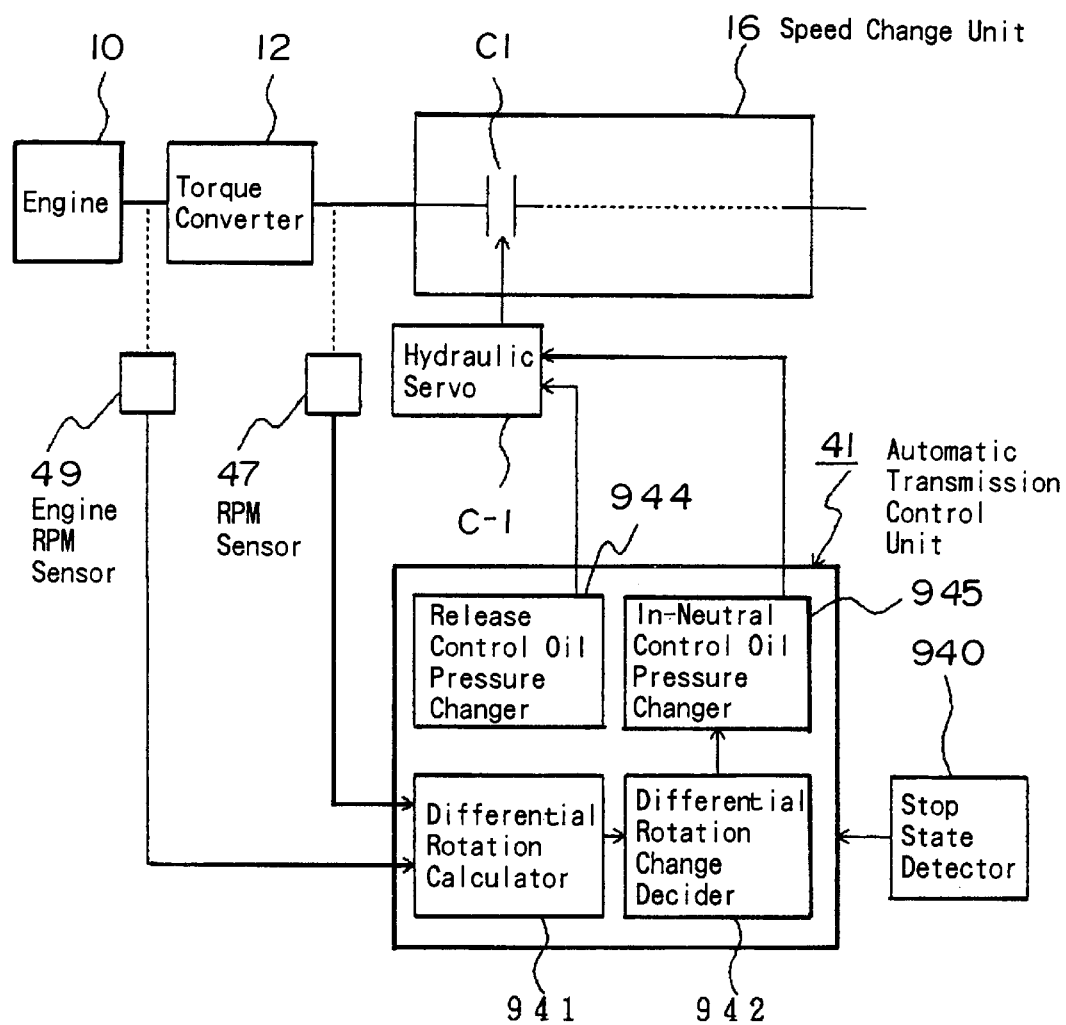
FIG. 1 is a block diagram of an embodiment of a control system for an automatic transmission in accordance with the present invention.

As shown in FIG. 1, the automatic transmission includes: a torque converter 12 acting as a fluid transmission unit for transmitting the rotation of an engine 10 to a speed change unit 16; a first clutch C1 acting as a clutch to be applied, when a forward running range is selected, to transmit the rotation from the torque converter 12 to the speed change mechanism of the speed change unit 16; a hydraulic servo C-1 for applying/releasing the first clutch C1; a stop state detector 940 for detecting a vehicle stop state in which a forward running range is selected, in which the throttle is fully closed, in which the brake pedal (not shown) is depressed and in which the vehicle speed is substantially zero; an engine RPM sensor 49 acting as an input side RPM detector for detecting the input side RPM of the torque converter 12; an RPM sensor 47 acting as an output side RPM detector for detecting the output side RPM of the torque converter 12; and an automatic transmission control unit 41.

The automatic transmission control unit 41 is equipped with: a release control oil pressure changer 944 for lowering the oil pressure (hereinafter "C-1 oil pressure") of the hydraulic servo C-1 by a first set pressure increment when the vehicle stop state is detected by the stop state detector 940; a rotational speed difference calculator 941 for calculating the difference between the input side RPM and the output side RPM; a rotational difference change decider 942 for deciding at each of set time intervals whether or not the rotational speed difference calculated by the rotational difference calculator 941 has changed; and an in-neutral control oil pressure changer 945 for raising the C-1 oil pressure by a second set pressure increment, when the rotational speed difference has not changed, and for lowering the C-1 oil pressure by a third set pressure increment when the rotational speed difference has changed. The first set pressure, the second set pressure and the third set pressure are set to different levels.

Figure 2:
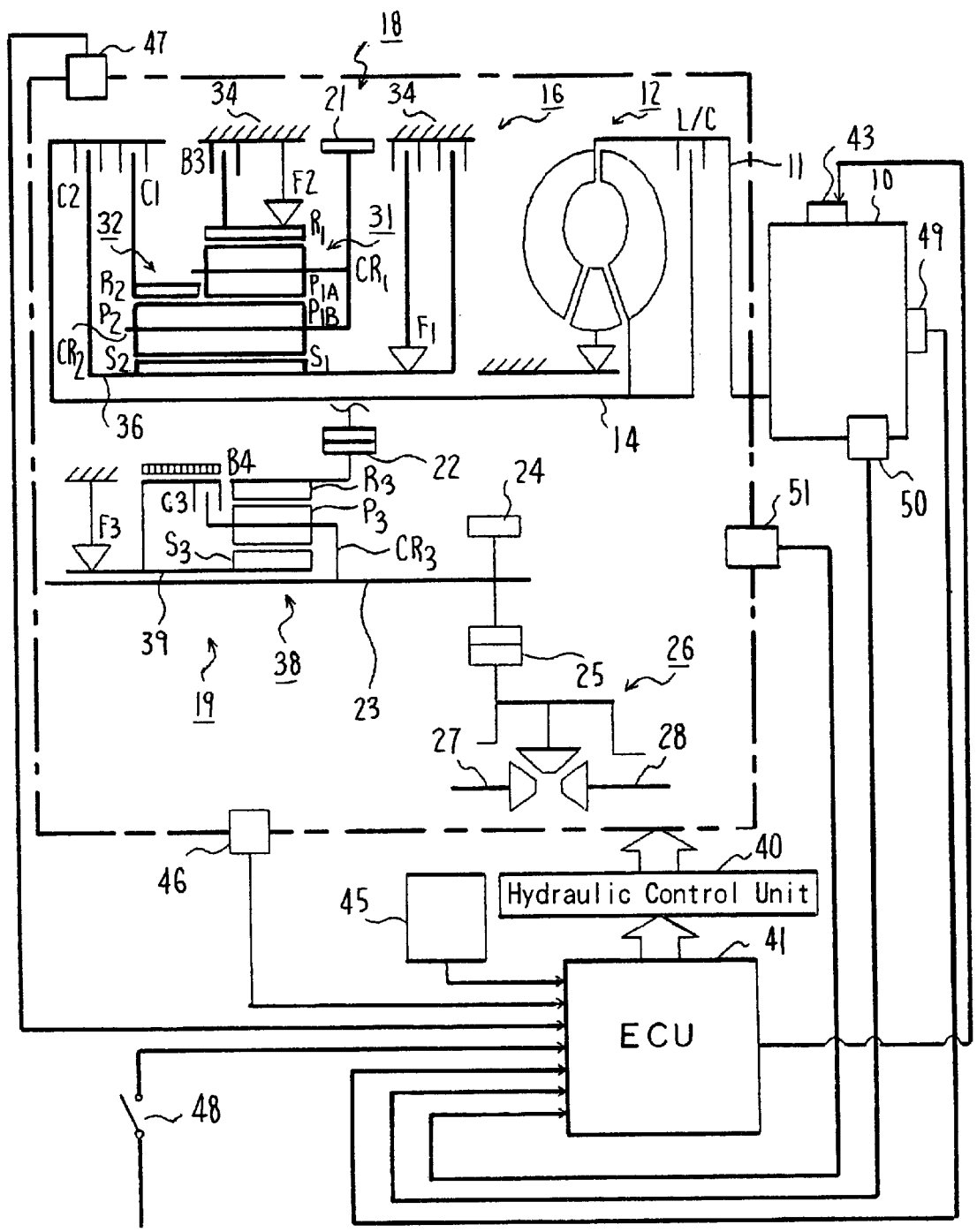
FIG. 2 is a schematic diagram of an automatic transmission controlled by the embodiment of FIG. 1.

As shown in FIG. 2, the rotation generated by the engine 10 is transmitted through an output shaft 11 to the torque converter 12. This torque converter 12 transmits the rotation of the engine 10 through a fluid (e.g., working oil) to an output shaft 14. When the vehicle speed exceeds a set value, however, a lockup clutch L/C is applied so that the rotation can be transmitted directly to the output shaft 14.

Output shaft 14 is connected the speed change unit 16 for establishing four forward and one reverse gear stages. This speed change unit 16 is composed of a main transmission 18 and an under-drive auxiliary transmission 19. The rotation of the main transmission 18 is transmitted through a counter drive gear 21 and a counter driven gear 22 to the auxiliary transmission 19. The rotation of output shaft 23 of the auxiliary transmission 19 is transmitted through an output gear 24 and a ring gear 25 to a differential unit 26.

In differential unit 26, the rotations received from the output gear 24 and the ring gear 25, are differentiated and transmitted through left and right drive shafts 27 and 28 to the drive wheels (not shown).

The main transmission 18 is equipped with a first planetary gear unit 31 and a second planetary gear unit 32. A first clutch C1, a second clutch C2, a first brake B1, a second brake B2, a third brake B3 and one-way clutches F1 and F2 transmit the torque selectively between the individual elements of the first planetary gear unit 31 and the second planetary gear unit 32.

The first planetary gear unit 31 is composed of: a ring gear $R_1$ connected to a drive unit case 34 through the third brake B3 and the one-way clutch F2 which are arranged in parallel with each other; a sun gear $S_1$ formed on a sun gear shaft 36 fitted over and rotatably supported by the output shaft 14; a carrier $CR_1$ connected to the counter drive gear 21; and pinions $P_{1A}$ and $P_{1B}$ meshed between the ring gear $R_1$ and the sun gear $S_1$ and rotatably supported by the carrier $CR_1$.

The sun gear shaft 36 is connected through the second clutch C2 to the output shaft 14, through the first brake B1 to the drive unit case 34 and through the one-way clutch F1 and the second brake B2, arranged in series with each other, to the drive unit case 34.

The second planetary gear unit 32 is composed of: a ring gear $R_2$ connected through the first clutch Cl to the output shaft 14; a sun gear $S_2$ formed on the sun gear shaft 36 integrally with the sun gear $S_1$; a carrier $CR_2$ connected to the carrier $CR_1$; and a pinion $P_2$ meshed between the ring gear $R_2$ and the sun gear $S_2$, rotatably supported by the carrier $CR_2$ and formed integrally with the pinion $P_{1B}$.

The counter drive gear 21 is meshed with the counter driven gear 22 in the auxiliary transmission 19, to transmit the rotation, at a speed established by the main transmission 18, to the auxiliary transmission 19.

The auxiliary transmission 19 is equipped with a third planetary gear unit 38, a third clutch C3, a fourth brake B4 and a one-way clutch F3 so that it may transmit the torque selectively between the individual components of the third planetary gear unit 38.

The third planetary gear unit 38 is composed of: a ring gear $R_3$ connected to the counter driven gear 22; a sun gear $S_3$ formed on a sun gear shaft 39 rotatably fitted on an output shaft 23; a carrier $CR_3$ fixed on the output shaft 23; and a pinion $P_3$ meshed between the ring gear $R_3$ and the sun gear S3 and rotatably supported by the carrier $CR_3$.

The operations of the automatic transmission as described above are tabulated in FIG. 3 wherein: $S_1$ designates a first solenoid valve; $S_2$ a second solenoid valve; $S_3$ a third solenoid valve; C1 the first clutch; C2 the second clutch; C3 the third clutch; B1 the first brake; B2 the second brake; B3 the third brake; B4 the fourth brake; and F1 to F3 the one-way clutches. Moreover: R is the reverse running range; N neutral range; D drive range; 1ST a first speed gear stage; 2ND a second speed gear stage; 3RD a third speed gear stage; and 4TH a fourth speed gear stage.

Moreover, in FIG. 3, symbol O indicates: that a first signal, a second solenoid signal and a third solenoid signal for opening/closing the first solenoid valve S1, the second solenoid valve S2 and the third solenoid valve S3, respectively, are ON; and that the first clutch C1, the second clutch C2, the third clutch C3, the first brake B1, the second brake B2, the third brake B3 and the fourth brake B4 are applied whereas the one-way clutches F1 to F3 are locked. On the other hand, symbol X indicates: that the first solenoid signal, the second solenoid signal and the third solenoid signal are OFF; and that the first clutch C1, the second clutch C2, the third clutch C3, the first brake B1, the second brake B2, the third brake B3 and the fourth brake B4 are released whereas the one-way clutches F1 to F3 are free. Symbol Δ indicates the state in which the third solenoid signal is ON/OFF during neutral control, and symbol (o) indicates that the third brake B3 is applied for engine braking.

At the first speed in the D-range, the first clutch C1 and the fourth brake B4 are applied, and the one-way clutches F2 and F3 are locked. Then, the rotation of the output shaft 14 (of FIG. 2) is transmitted through the first clutch C1 to the ring gear $R_2$. In this state, the rotation of the ring gear $R_1$ is blocked by the one-way clutch F2 so that the rotation of the carrier $CR_2$ is drastically decelerated, with idle rotation of the sun gear $S_2$, and transmitted to the counter drive gear 21.

The rotation, as transmitted from the counter drive gear 21 to the counter driven gear 22, is further transmitted to the ring gear $R_3$. However, the rotation of the sun gear $S_3$ is blocked by the fourth brake B4 so that the rotation of the carrier $CR_3$ is further decelerated and transmitted to the output shaft 23.

At the second speed in the D-range, on the other hand, the first clutch C1, the first brake B1, the second brake B2 and the fourth brake B4 are applied, and the one-way clutches F1 and F3 are locked. The rotation of the output shaft 14 is transmitted through the first clutch C1 to the ring gear $R_2$. At the same time, the rotation of the sun gear $S_2$ is blocked by the second brake B2 and the one-way clutch F1 so that the rotation of the ring gear $R_2$ is decelerated and transmitted to the carrier $CR_2$. The rotation of the carrier $CR_2$ is transmitted to the counter drive gear 21 while rotating the ring gear $R_1$ idly.

The rotation, as transmitted from the counter drive gear 21 to the counter driven gear 22, is transmitted to the ring gear $R_3$. However, the rotation of the sun gear $S_3$ is blocked by the fourth brake B4 so that the rotation of the carrier $CR_3$ is decelerated and transmitted to the output shaft 23.

In third speed in the D-range, the first clutch C1, the third clutch C3, the first brake B1 and the second brake B2 are applied, and the one-way clutch F1 is locked. The rotation of the output shaft 14 is transmitted through the first clutch C1 to the ring gear $R_2$. At the same time, the rotation of the sun gear $S_2$ is blocked by the second brake B2 and the one-way clutch F1 so that the rotation of the ring gear $R_2$ is decelerated and transmitted to the carrier $CR_2$. The rotation of carrier $CR_2$ is transmitted to the counter drive gear 21 while rotating the ring gear $R_1$ idly.

The rotation, as transmitted from the counter drive gear 21 to the counter driven gear 22, is further transmitted to the ring gear $R_3$. However, the relative rotation between the carrier $CR_3$ and the sun gear $S_3$ is blocked by the third clutch C3 so that the third planetary gear unit 38 comes into a direct-coupled state. As a result, the rotation of the counter driven gear 22 is transmitted unchanged to the output shaft 23.

In fourth speed in the D-range, the first clutch Cl, the second clutch C2, the third clutch C3 and the second brake B2 are applied. The rotation of the output shaft 14 is transmitted through the first clutch C1 to the ring gear $R_2$ and through the second clutch C2 to the sun gear $S_2$ so that the first planetary gear unit 31 and the second planetary gear unit 32 come into the direct-coupled state. As a result, the rotation of the output shaft 14 is transmitted unchanged to the counter drive gear 21.

The rotation, as transmitted from the counter drive gear 21 to the counter driven gear 22, is further transmitted to the ring gear $R_3$. However, the relative rotation between the carrier $CR_3$ and the sun gear $S_3$ is blocked by the third clutch C3 so that the third planetary gear unit 38 comes into the direct-coupled state. As a result, the rotation of the counter driven gear 22 is transmitted as is to the output shaft 23.

The automatic transmission is provided with the hydraulic control unit 40 for establishing the individual gear stages by selectively applying/releasing the first clutch C1, the second clutch C2, the third clutch C3, the first brake B1, the second brake B2, the third brake B3 and the fourth brake B4.

The engine 10 is provided with a separate engine control unit 43 for its control.

The hydraulic control unit 40 and the engine control unit 43 are connected with the automatic transmission control unit (ECU) 41 so that they are operated according to the control program of the automatic transmission control unit 41.

The automatic transmission control unit 41 receives individual control signals from a neutral start switch 45, an oil temperature sensor 46, an RPM sensor 47, a brake switch 48, an engine RPM sensor 49, a throttle opening sensor 50 and a vehicle speed sensor 51.

The shift position of the shift lever (not shown), namely, the selected range, is detected by the neutral start switch 45. The oil temperature in the hydraulic control unit 40 is detected by the oil temperature sensor 46. The RPM of the output shaft 14 (hereinafter "clutch input side RPM") $N_{C1}$, located at the input side of the first clutch C1, is detected by the RPM sensor 47. The clutch input side RPM $N_{C1}$ is detected as the output side RPM of the torque converter 12.

Depression of the brake pedal (not shown) is detected by the brake switch 48. Engine RPM $N_E$ is detected by the engine RPM sensor 49, throttle opening is detected by the throttle opening sensor 50 and vehicle speed is detected by the vehicle speed sensor 51. The engine RPM $N_E$ is detected as the input side RPM of the torque converter 12.

Figure 4:
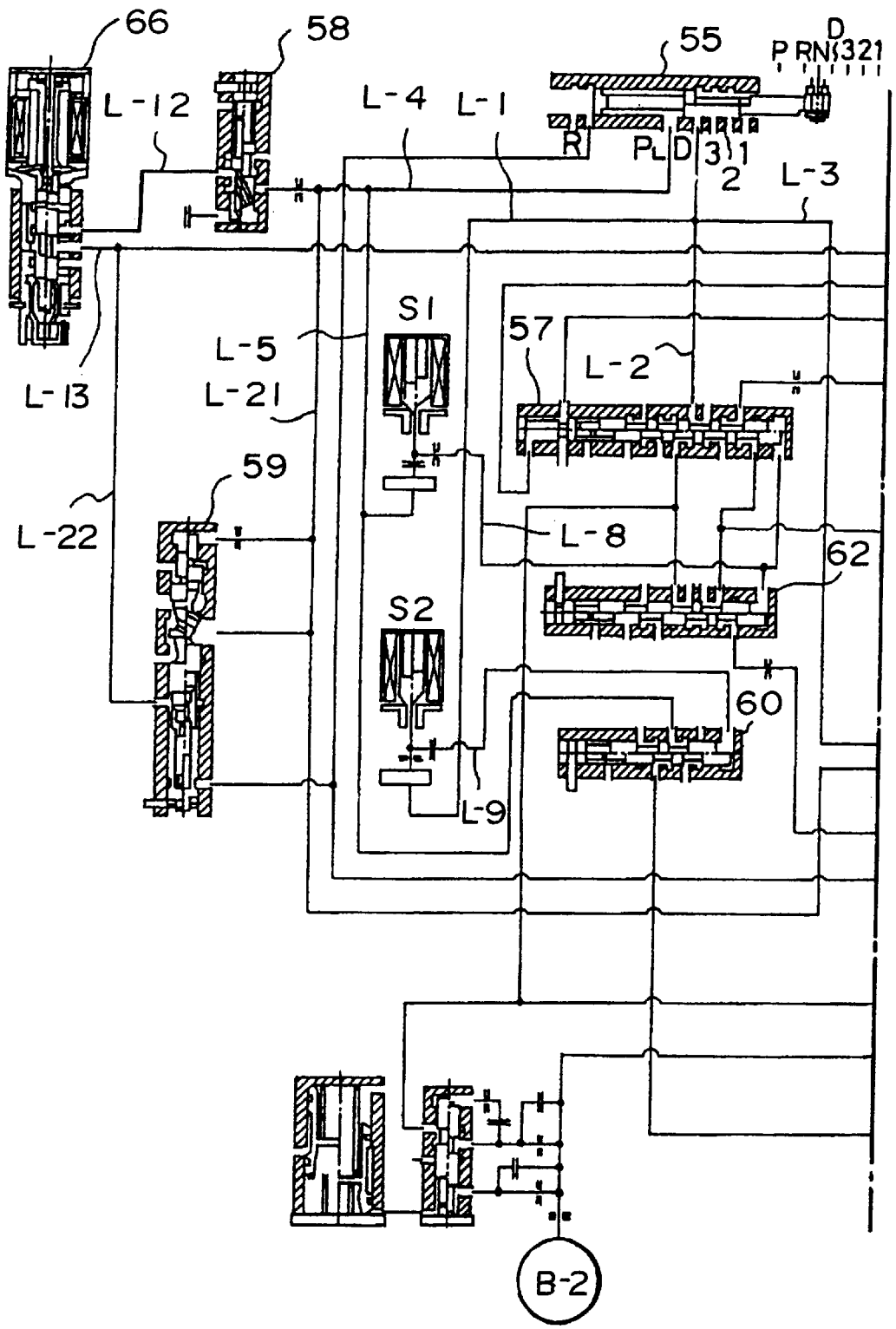
FIG. 4 is a diagram of a first portion of a hydraulic control unit utilized with the embodiment of FIG. 1.
Figure 5:
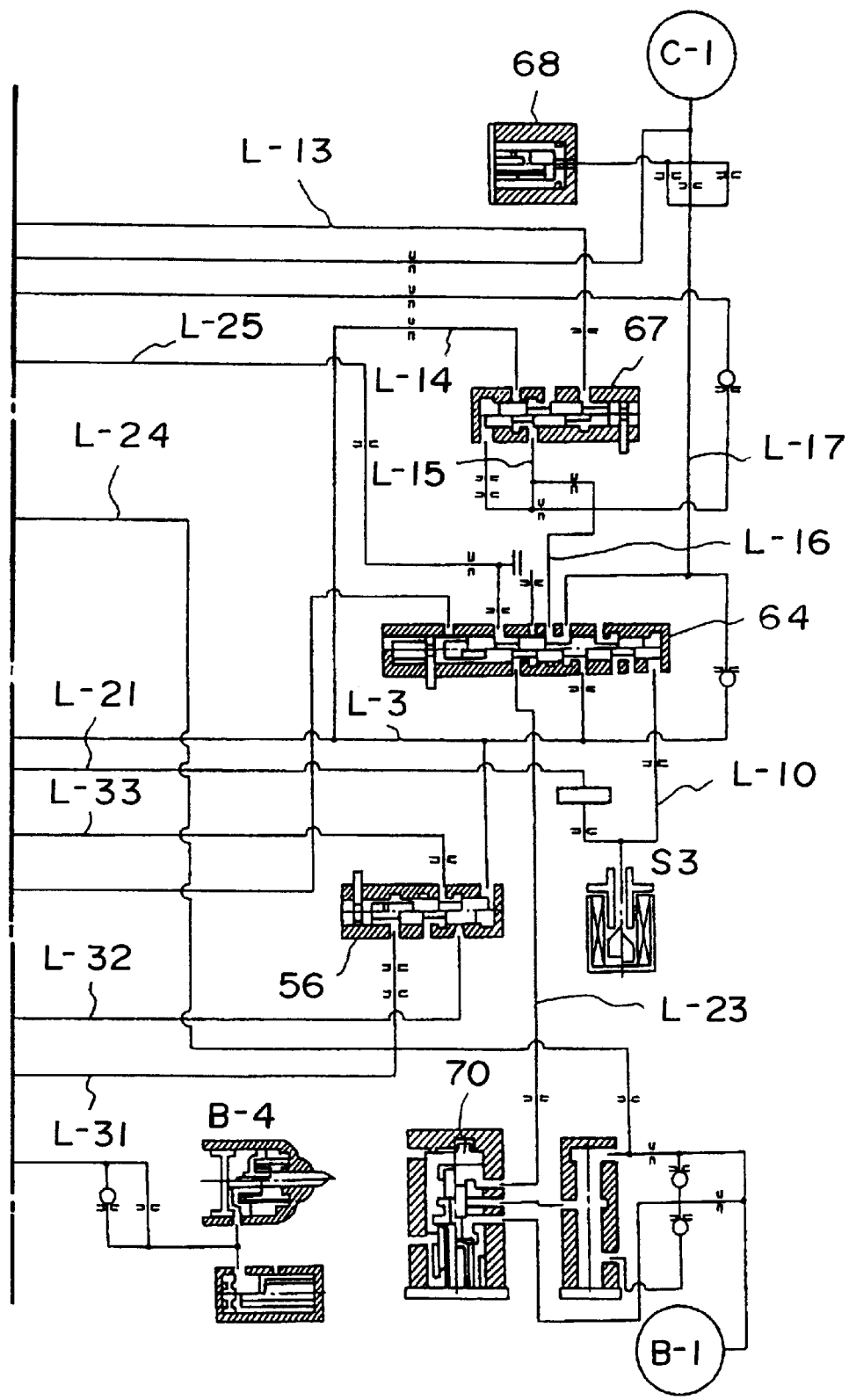
FIG. 5 is a diagram of the remainder of the hydraulic control unit shown in part in FIG. 4.

As shown in FIGS. 4 and 5, hydraulic control unit 40 includes a primary valve 59 which regulates the oil pressure coming from the oil pressure source(not shown), and outputs it as a line pressure to an oil line L-21. A manual valve 55 is provided with ports 1, 2, 3, D, $P_L$ and R so that the line pressure, as fed from the primary valve 59 via oil lines L-21 and L-4 to the port $P_L$, is established as a 1-range pressure, a 2-range pressure, a 3-range pressure, a D-range pressure or an R-range pressure at the ports 1, 2, 3, D and R, respectively, by operation of the shift lever (not shown).

When the shift lever is placed in the D-range position, the D-range pressure oil, as established at the port D, is fed via an oil line L-1 to the second solenoid valve S2, via an oil line L-2 to a 1–2 shift valve 57, and via an oil line L-3 to a B-1 sequence valve 56.

On the other hand, the line pressure from the primary valve 59 is fed via the oil line L-21 to the third solenoid valve S3. The line pressure from the primary valve 59 is further fed via the oil lines L-21 and L-4 to a solenoid modulator valve 58 and via the oil lines L-21 and L-5 to the first solenoid valve S1 and a 2–3 shift valve 60.

The first solenoid signal, the second solenoid signal and the third solenoid signal for opening/closing the first solenoid valve S1, the second solenoid valve S2 and the third solenoid valve S3 are turned ON/OFF in response to change-over signals coming from the automatic transmission control unit 41 (of FIG. 2). As a result, the first solenoid valve S1 feeds the signal oil pressure via an oil line L-8 to the 1–2 shift valve 57 and a 3–4 shift valve 62; the second solenoid valve S2 feeds a signal oil pressure via an oil line L-9 to the 2–3 shift valve 60. The third solenoid valve S3 feeds the change-over signal oil pressure via an oil line L-10 to a neutral relay valve 64.

The 1–2 shift valve 57 takes its upper half position (i.e., the upper position of the spool) at the 1ST speed and the lower half position (i.e., the lower position of the spool) at the 2ND to 4TH speeds. The 2–3 shift valve 60 takes the lower half position at the 1ST and 2ND speeds and the upper half position at the 3RD and 4TH speeds. The 3–4 shift valve 62 takes the upper half position at the 1ST and 4TH speeds and the lower half position at the 2ND and 3RD speeds. The neutral relay valve 64 takes the upper half position at the time of neutral control and the lower half position at the 1ST to 4TH speeds.

The solenoid modulator valve 58 is connected via an oil line L-12 with a linear solenoid valve 66, and this linear solenoid valve 66 is connected via an oil line L-13 with a C-1 control valve 67. The linear solenoid valve 66 is further connected via oil lines L-13 and L-22 with the primary valve 59.

The linear solenoid valve 66 is controlled in response to the control signal from the automatic transmission control unit 41 to feed a throttle pressure $P_{TH}$, via the oil line L-13, as the control signal oil pressure to the C-1 control valve 67. On the other hand, this C-1 control valve 67 is fed with the D-range pressure via oil lines L-3 and L-14 so that it regulates the received D-range pressure to produce a C-1 oil pressure $P_{C1}$, corresponding to the throttle pressure $P_{TH}$ from the linear solenoid valve 66, and feeds the C-1 oil pressure $P_{C1}$, to an oil line L-15.

The B-1 sequence valve 56 is equipped at its left end with a spring (not shown) which applies a load to the spool and is provided at its right end with a control oil chamber. Moreover, the B-1 sequence valve 56 receives the D-range pressure at the 1ST speed, via the oil line L-3 at its control oil chamber, and is thereby moved to the lower half position shown in the drawing, and receives the sequence pressure at the 2ND speed, which is the oil pressure fed to and raised by a hydraulic servo B-2, from the hydraulic servo B-2 via an oil line L-31, so that the spool is pushed rightward by the sequence pressure and the spring load to bring the B-1 sequence valve 56 into the upper half position.

As a result, the oil pressure from the 1–2 shift valve 57 is fed via an oil line L-32 to the B-1 sequence valve 56, further via an oil line L-33 to the 3–4 shift valve 62 and via an oil line L-24 and through a B-1 control valve 70 to a hydraulic servo B-1. Thus, the oil pressure is fed to the hydraulic servo B-1 in response to the rise in the oil pressure in the hydraulic servo B-2.

The neutral relay valve 64 takes the upper half position in neutral control. In neutral control, therefore, the C-1 oil pressure $P_{C1}$, as fed to the oil line L-15, is further fed via an oil line L-16, through the neutral relay valve 64 and via the oil line L-17, to the hydraulic servo C-1. On the other hand, the oil pressure, as fed through the B-1 sequence valve 56 to the 3–4 shift valve 62, is also fed to the 1–2 shift valve 57 and is further fed as the signal oil pressure from the 1–2 shift valve 57 via an oil line L-25, through the neutral relay valve 64 and via an oil line L-23, to the B-1 control valve 70.

The neutral relay valve 64 takes the lower half position in the 1ST to 4TH speeds. In the 1ST to 4TH speeds, therefore, the oil under the D-range pressure is fed via the oil line L-3, through the neutral relay valve 64 and via an oil line L-17, to the hydraulic servo C-1. In neutral control, on the other hand, the neutral relay valve 64 takes the upper half position to connect the oil line L-16 and the oil line L-17.

A damper valve 68 is arranged in the oil line L-17 for smoothing the release of the oil pressure from the hydraulic servo C-1. Reference character B-4 designates a hydraulic servo for the fourth brake B4.

Figure 6:
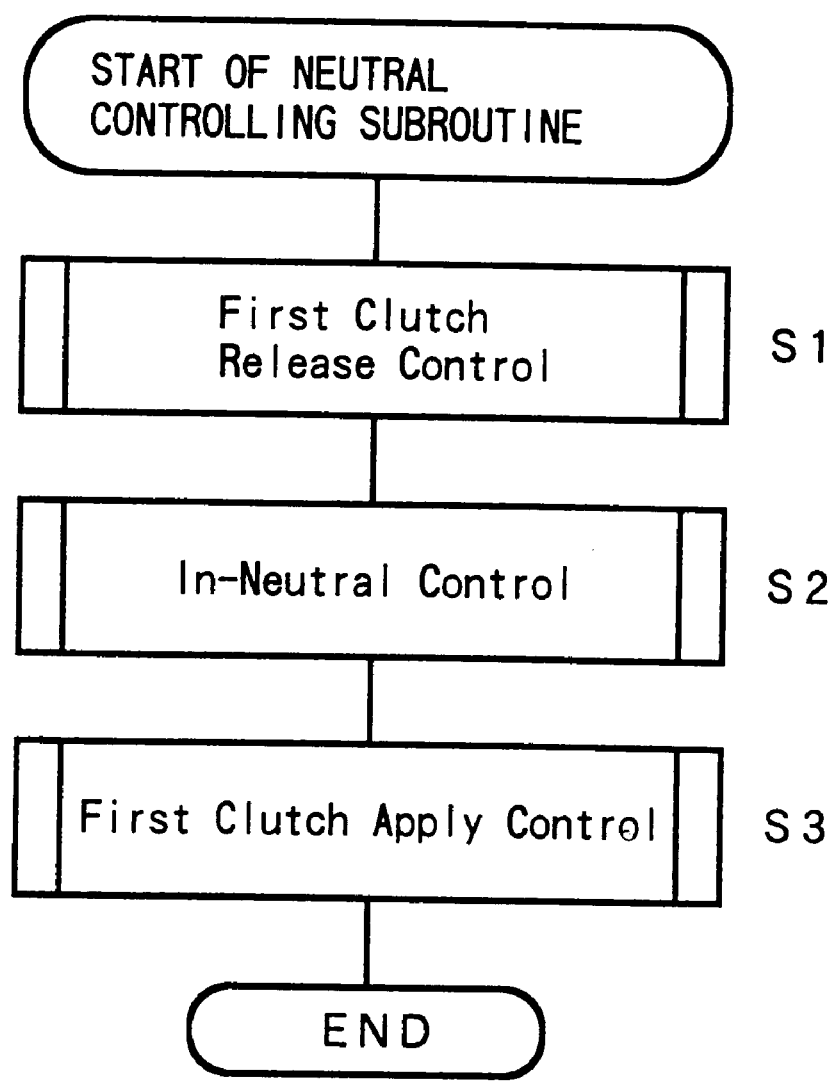
FIG. 6 is a flow chart of a neutral control routine executed by the embodiment of the control system shown in FIG. 1.

In the neutral control routine shown in FIG. 6:

Step S1: A release control routine is executed. In this operation, the zero vehicle speed is estimated, and the 2ND speed shift signal is generated at a set timing to start the applications of the second brake B2 (of FIG. 2) and the first brake B1 for hill-holding control and to sweep down the C-1 oil pressure $P_{C1}$ at a set timing.

For this operation, the engine RPM $N_E$ corresponding to the input torque of the speed change unit 16 is determined, and the C-1 oil pressure $P_{C1}$ corresponding to the engine RPM $N_E$ is output and is then gradually lowered.

The input torque can be detected not only from the engine RPM NE but also indirectly from the engine air suction or the fuel injection rate. In addition, the input torque of the speed change unit 16 can also be directly detected by a torque sensor(not shown). In this case, the torque sensor is attached to the output shaft 14 of the torque converter 12.

Step S2: The in-neutral control is executed to establish the neutral control state. In this operation, stabilization of the engine RPM $N_E$ and the clutch input side RPM $N_{C1}$ are awaited. After stabilization, the C-1 oil pressure $P_{C1}$ is raised or lowered to correspond the two stabilized RPMs.

Step S3: The first clutch apply control is executed. In this operation, the C-1 oil pressure $P_{C1}$ is raised by a set pressure, as set on the basis of a throttle opening θ and the engine RPM $N_E$, until end of the movement of the piston (end of piston stroke) of the hydraulic servo C-1 (of FIG. 5). After the end of the piston stroke in the hydraulic servo C-1, the C-1 oil pressure $P_{C1}$ is raised by another set pressure increment to prevent application shock.

Figure 8:
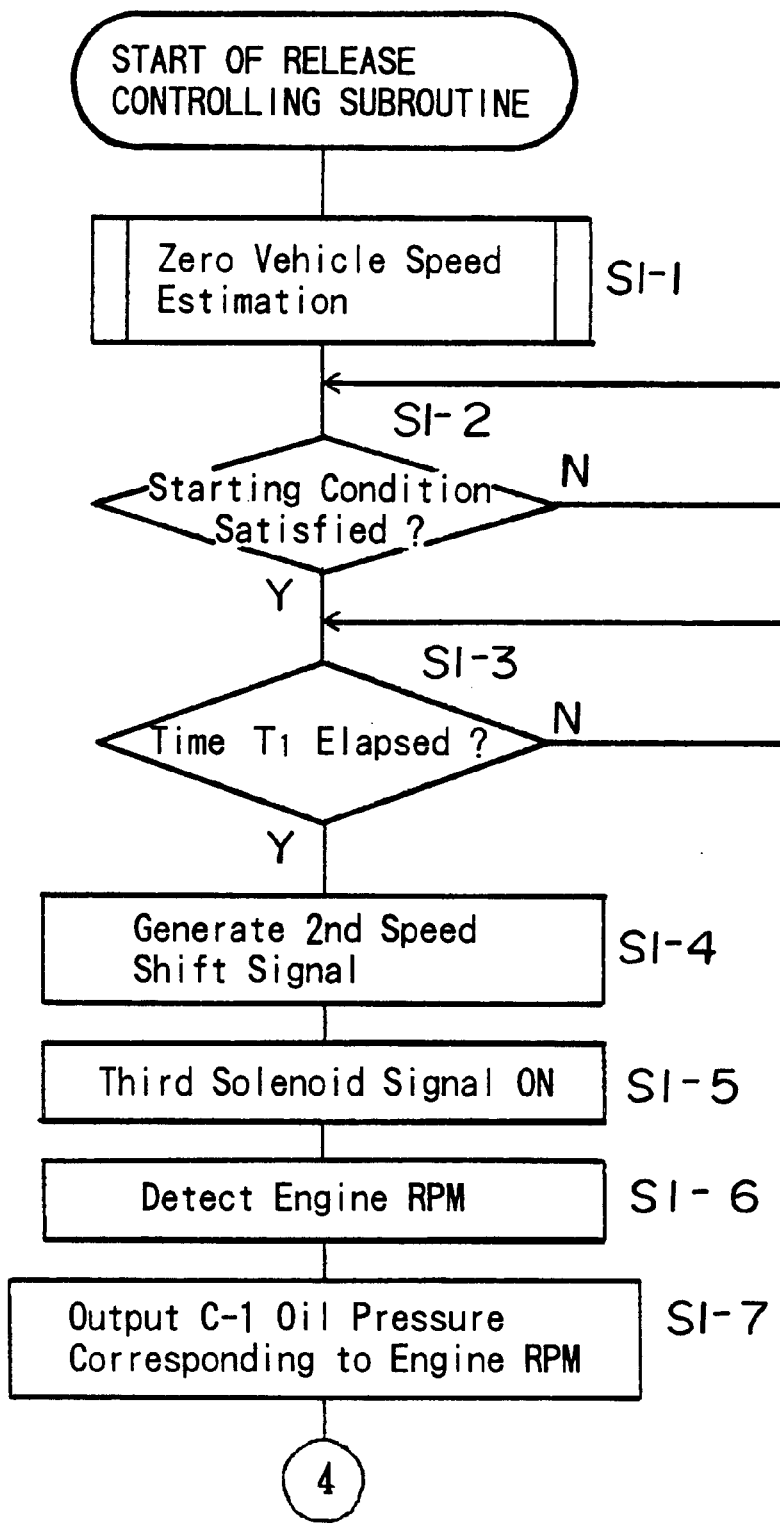
FIG. 8 is a flow chart of part of a release controlling routine executed by the embodiment of FIG. 1.
Figure 9:
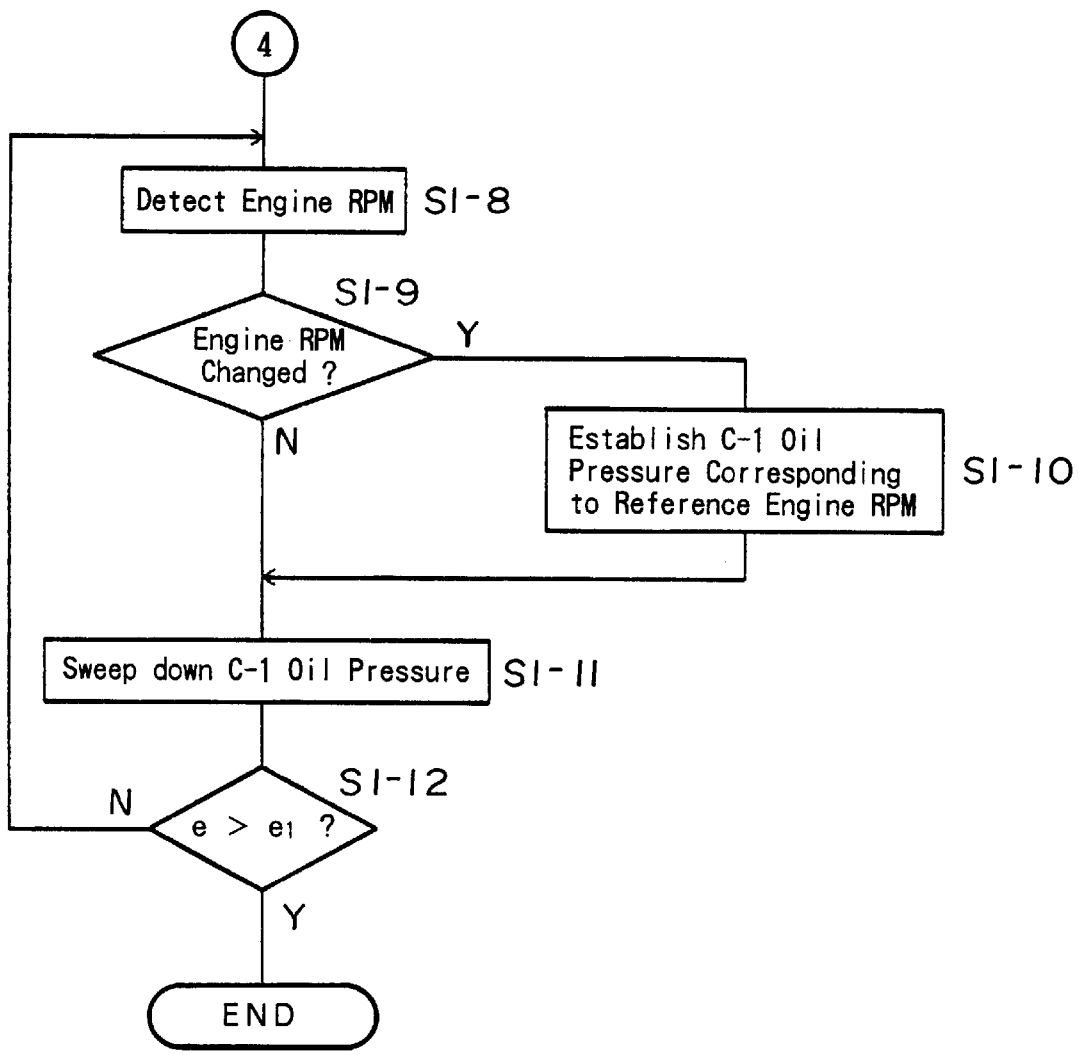
FIG. 9 is a flow chart of the remainder of the release controlling routine shown in part in FIG. 8.
Figure 10:
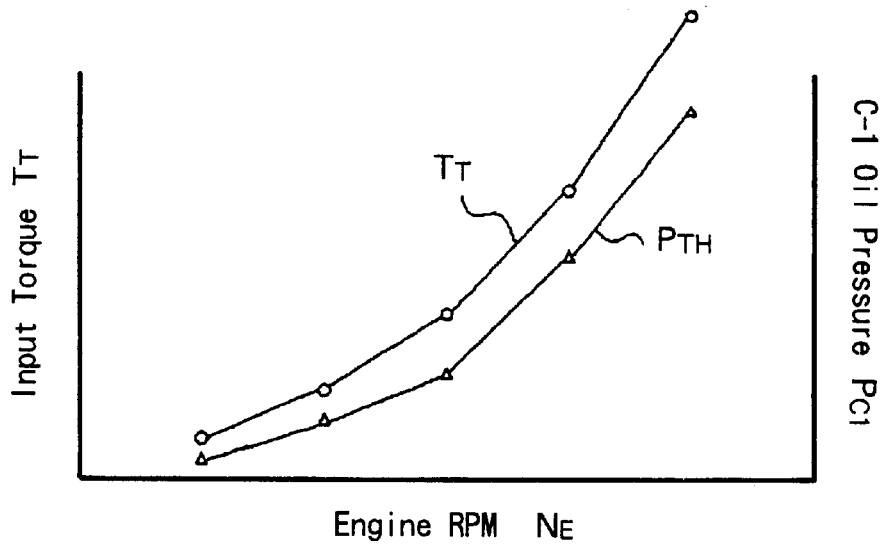
FIG. 10 is a graph of engine RPM versus input torque $T_T$ and C-1 oil pressure $P_{C1}$ in the embodiment of FIG. 1.

The release controlling subroutine of Step S1 of FIG. 6 will now be described with reference to FIGS. 8–10. In FIG. 10, the abscissa indicates the engine RPM $N_E$, and the ordinate indicates an input torque $T_T$ (=t·C·$N_E^2$) and the C-1 oil pressure $P_{C1}$.

Step S1-1: The zero vehicle speed is estimated on the basis of the change in the clutch input side RPM $N_{C1}$.

Step S1-2: The stop state detector 940 (of FIG. 1) awaits the satisfaction of the condition for starting the neutral control. At the same time, operation of a first timer (not shown) is started.

It is decided that the starting condition is satisfied when all of the following conditions are satisfied: that the clutch input side RPM $N_{C1}$ is substantially 0; that the accelerator pedal (not shown) is released so that the throttle opening θ is no more than a predetermined value; that the oil temperature detected by the oil temperature sensor 46 (of FIG. 2) is higher than a predetermined value; and that the brake pedal (not shown) is depressed so that the brake switch 48 is ON. Whether or not the clutch input side RPM $N_{C1}$ is substantially 0 is decided depending upon whether or not the RPM sensor 47 detects a detection limit. In this embodiment, the detection limit is a set value of 2 Km/h for the actual vehicle speed.

Step S1-3: The stop state detector 940 awaits the lapse of a time $T_1$, as measured by the first timer, and the routine advances to Step S1-4 when the time $T_1$ elapses. Here, the time $T_1$ is calculated by the zero vehicle speed estimation, and it is estimated that the vehicle speed drops to zero, when the time $T_1$ has elapsed.

Step S1-4: In order to start the hill-hold control, the 2ND speed shift signal is generated to turn ON the first solenoid signal for opening/closing the first solenoid valve S1 (FIG. 4) so that the oil pressure is fed to the hydraulic servo B-2 to apply the second brake B2. As the oil pressure in the hydraulic servo B-2 rises, on the other hand, the sequence pressure in the hydraulic servo B-2 is fed to the B-1 sequence valve 56 (of FIG. 5) so that the oil pressure is fed to the hydraulic servo B-1 to apply the first brake B1.

Thus, the hill-hold control establishes the 2ND speed gear stage in the speed change unit 16 so that the first clutch C1, the first brake B1, the second brake B2 and the fourth brake B4 are applied whereas the one-way clutches F1 and F3 are locked. When the vehicle in this state starts to move backward while facing uphill on an incline, the torque is transmitted to the output shaft 23 of the auxiliary transmission 19 which urges rotation of the ring gear $R_1$ in forward direction. However, this forward rotation is blocked by the one-way clutch F2 so that the vehicle cannot move backward.

Step S1-5: The third solenoid signal SG3 is turned ON to place the neutral relay valve 64 in the upper half position to thereby bring the C-1 oil pressure $P_{C1}$ into a controllable state.

Step S1-6: The engine RPM $N_E$ corresponding to the input torque $T_T$ is detected, as illustrated in FIG. 10, to set the reference engine RPM $N_{Em}$ to the value of the engine RPM $N_E$.

Step S1-7: The C-1 oil pressure $P_{C1}$ immediately before the start of release of the first clutch C1 is established in a manner to correspond to the engine RPM $N_E$ and output.

Step S1-8: The engine RPM $N_E$ corresponding to the input torque $T_T$ is again detected.

Step S1-9: The engine RPM $N_E$ is compared with the reference engine RPM $N_{Em}$ to decide whether or not it has changed. The routine advances to Step S1-10, when the answer is YES, but to Step S1-11 when NO.

Step S1-10: The value of the engine RPM $N_E$, when it is decided at Step S1-9 that the engine RPM $N_E$ has changed with reference to the reference engine RPM $N_{Em}$, is set as the reference engine RPM $N_{Em}$ and the C-1 oil pressure $P_{C1}$ corresponding to the updated reference engine RPM $N_{Em}$ is established and output.

Step S1-11: The release control oil pressure changer 944 lowers (or sweeps down) the C-1 oil pressure $P_{C1}$ by a first set pressure $\Delta P_{TH}$DOWN, i.e. a predetermined oil pressure increment, as expressed by the following Formula, after each lapse of a set time period $T_{Down}$:

$P_{TH}=P_{TH}-\Delta P_{TH}$DOWN.

Step S1-12: It is decided whether or not a speed ratio e (=$N_{C1}/N_E$) is larger than a constant e1. The routine is ended, when the speed ratio e is larger than the constant e1, but returns to Step S1-8 when the speed ratio e is no more than the constant e1. This constant $e_1$ is set to 0.75, for example, by taking into consideration the delay in the change of the clutch input side RPM $N_{C1}$ which results from the action of the oil pressure at the instant when the first clutch C1 is released. Here, the speed ratio e may be replaced by the clutch input side RPM $N_{C1}$.

However, even when the applied state of the first clutch C1 is detected by deciding whether or not the rotational difference ΔN, i.e., the difference between the engine RPM $N_E$ or the input side RPM of the torque converter 12 and the clutch input side RPM $N_{C1}$ or the output side RPM of the same, has changed. The rotational speed difference ΔN will not change either in the state where the first clutch C1 is completely applied or in the state where the same is released. It is, therefore, difficult to discriminate between the state wherein the first clutch C1 is completely applied and the state wherein the same is released.

By awaiting the speed ratio e to exceed the constant e, therefore, it is possible to reliably establish the state immediately before the application of the first clutch C1 is started. Here, the rotational speed difference $\Delta N$ is calculated by the rotational difference calculator 941 in the automatic transmission control unit 41.

Figure 11:
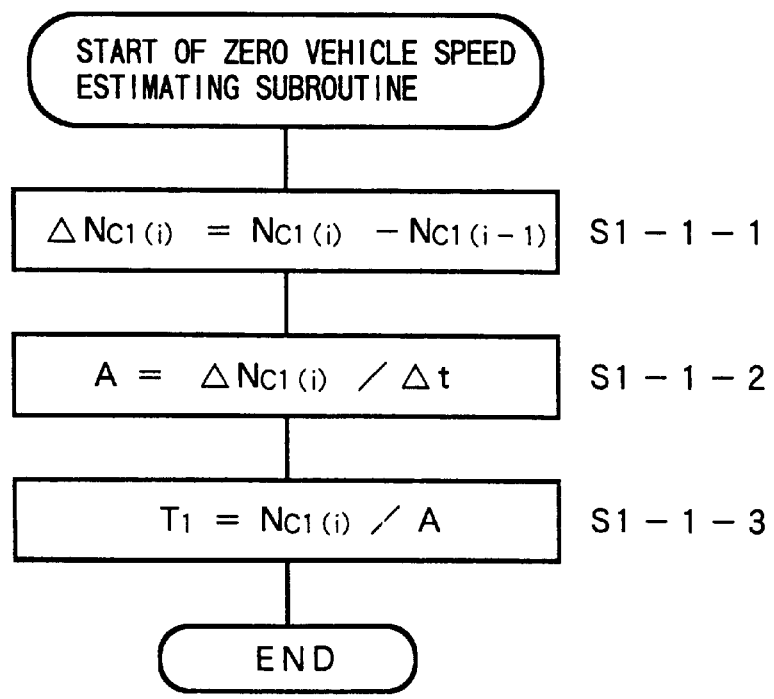
FIG. 11 is a flow chart of a zero vehicle speed estimating routine executed by the control system of FIG. 1.

Here will be described the zero vehicle speed estimating subroutine of Step S1-1 of FIG. 8 with reference to the flow chart of FIG. 11 for the zero vehicle speed estimating routine wherein:

Step S1-1-1: The RPM difference $\Delta N_{C1}(i)$ is calculated by subtracting the clutch input side RPM $N_{C1}(i-1)$ at a time $\Delta t$ earlier from the present clutch input side RPM $N_{C1}(i)$. In this case, the time $\Delta t$ is set by the clock in the automatic transmission control unit 41 (of FIG. 2) so that the clutch input side RPM $N_{C1}$ is detected at every time interval $\Delta t$.

Step S1-1-2: Deceleration A of the vehicle is calculated by dividing the RPM difference $\Delta N_{C1}(i)$, by the time $\Delta t$.

Step S1-1-3: A time period $T_1$ for reaching the vehicular stop state is calculated by dividing the present clutch input side RPM $N_{C1}(i)$, by the deceleration A.

Figure 12:
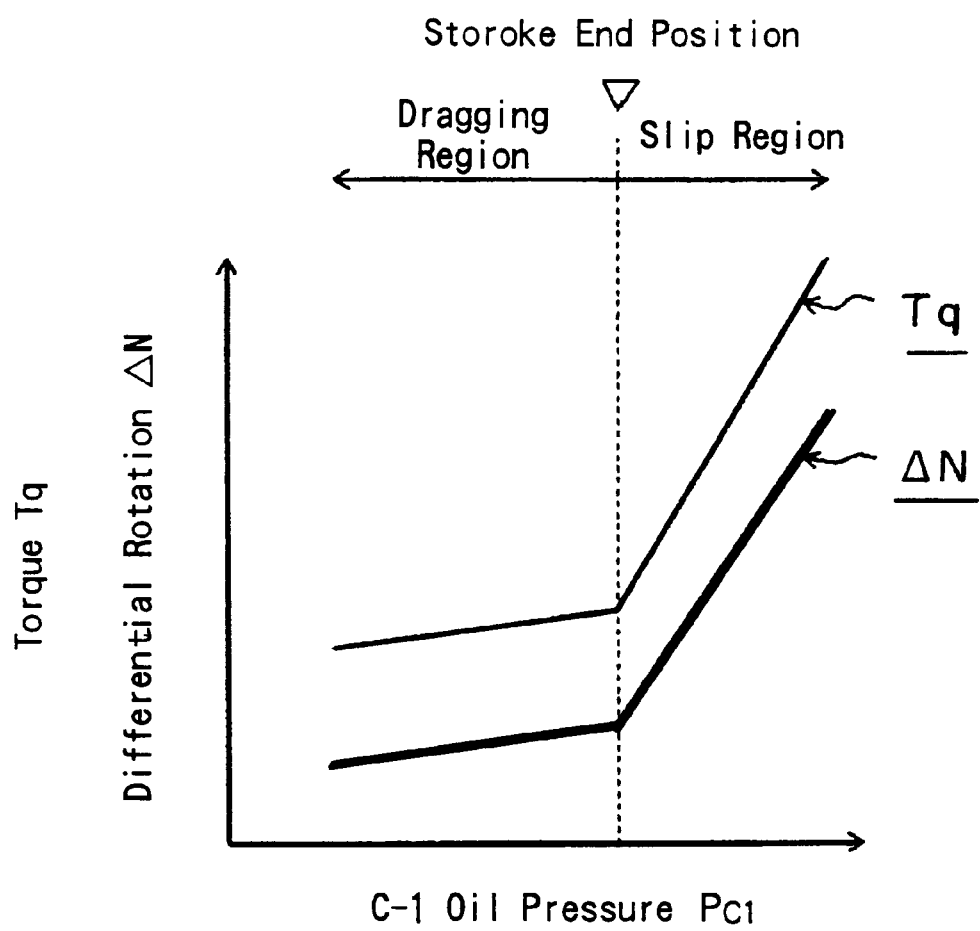
FIG. 12 is a graph of torque $T_q$ and differential in rotation speed $\Delta N$, serving to illustrate operation of the first clutch in an embodiment of the invention.

The relationship between the applied/released state of the first clutch C1 and the rotational difference $\Delta N$ is illustrated in FIG. 12 wherein the abscissa indicates the C-1 oil pressure $P_{C1}$, and the ordinate indicates the rotational speed difference $\Delta N$ and a torque Tq to be transmitted through the first clutch C1 from the engine 10 (of FIG. 2).

As the C-1 oil pressure $P_{C1}$ is gradually raised, the torque Tq is also raised. In accordance with this rise, the load applied to the torque converter 12 is increased so that the rotational difference $\Delta N$ is accordingly increased.

By determining rotational speed difference $\Delta N$, therefore, it is possible to know the applied/released state of the first clutch C1, namely, the torque transmission state.

When the application of the first clutch C1 is started from the completely released state by rise of the C-1 oil pressure $P_{C1}$, the piston of the hydraulic servo C-1 (of FIG. 5) reaches the position (hereinafter "stroke end position") at which the piston stroke is finished. When the C-1 oil pressure $P_{C1}$ is then further raised, the first clutch C1 comes into the completely applied state. Therefore, the region after the first clutch C1 is completely released and before the piston reaches the stroke end position is defined as the drag region (or the inactive region), and the region after the piston reaches the stroke end position and before the first clutch C1 is completely applied is defined as the slip region (or the active region).

In the drag region, the individual friction members (not shown) of the first clutch C1 are not in contact with one another. Due to the viscous characteristics of the oil existing between the individual friction members, however, some torque Tq is transmitted through the first clutch C1. This torque Tq gradually rises as the stroke of the piston continues to reduce the gaps between the friction members. In the drag region, therefore, the rotational speed difference $\Delta N$ occurs as the torque Tq is transmitted, and is gradually enlarged as the torque Tq grows larger.

In the slip region, on the other hand, the individual friction members are held in contact with each other so that a frictional force is generated to raise the torque Tq abruptly. The piston has already reached the stroke end position so that the oil flow into the hydraulic servo C-1 raises the C-1 oil pressure $P_{C1}$ abruptly. As a result, the frictional force is accordingly raised to further raise the torque Tq, and the rotational speed difference $\Delta N$ also abruptly rises.

Figure 13:
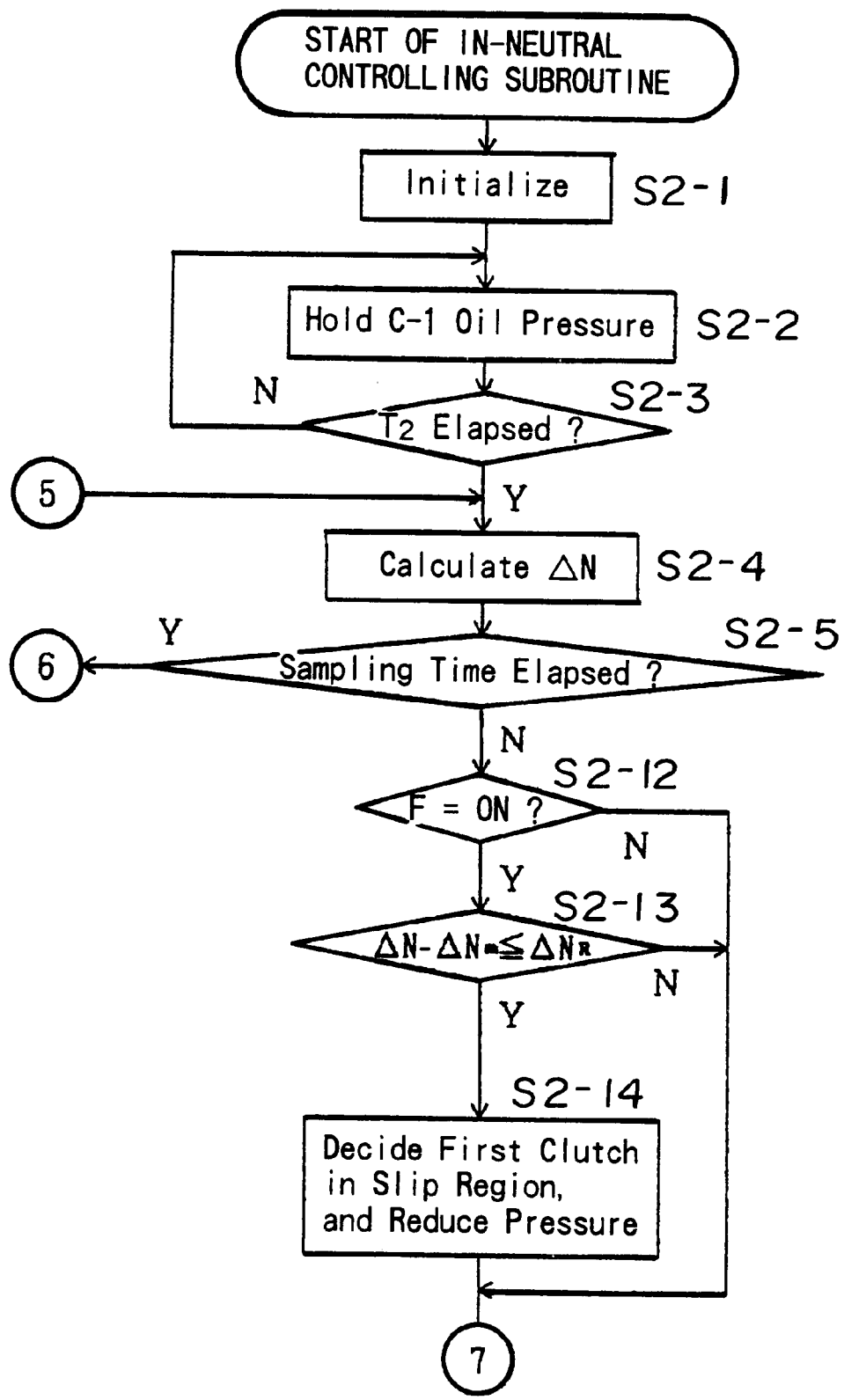
FIG. 13 is a partial flow chart of an in-neutral controlling routine executed by the embodiment of the control system shown in FIG. 1.
Figure 14:
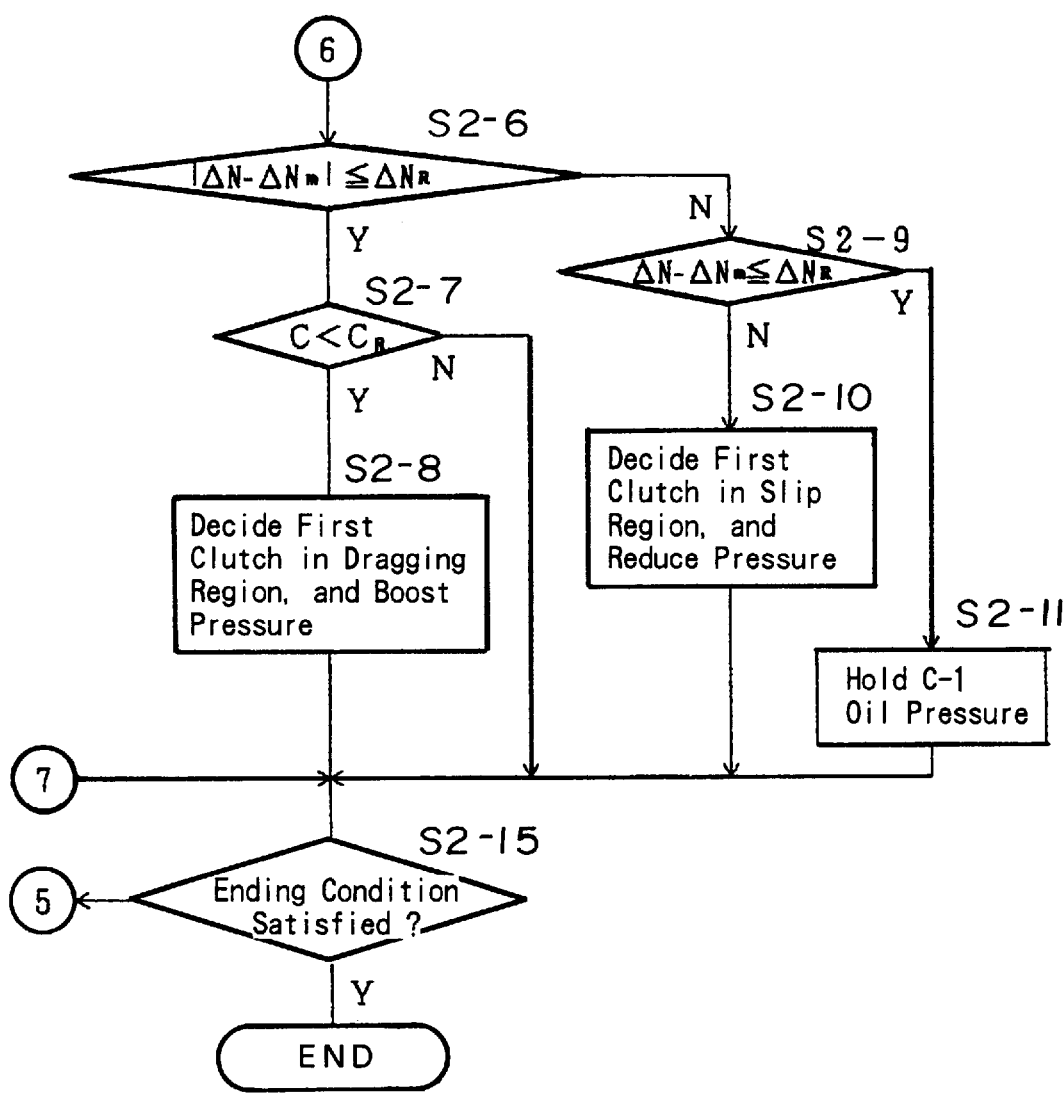
FIG. 14 is a flow chart of the remainder of the in-neutral controlling routine shown in part in FIG. 13.
Figure 15:
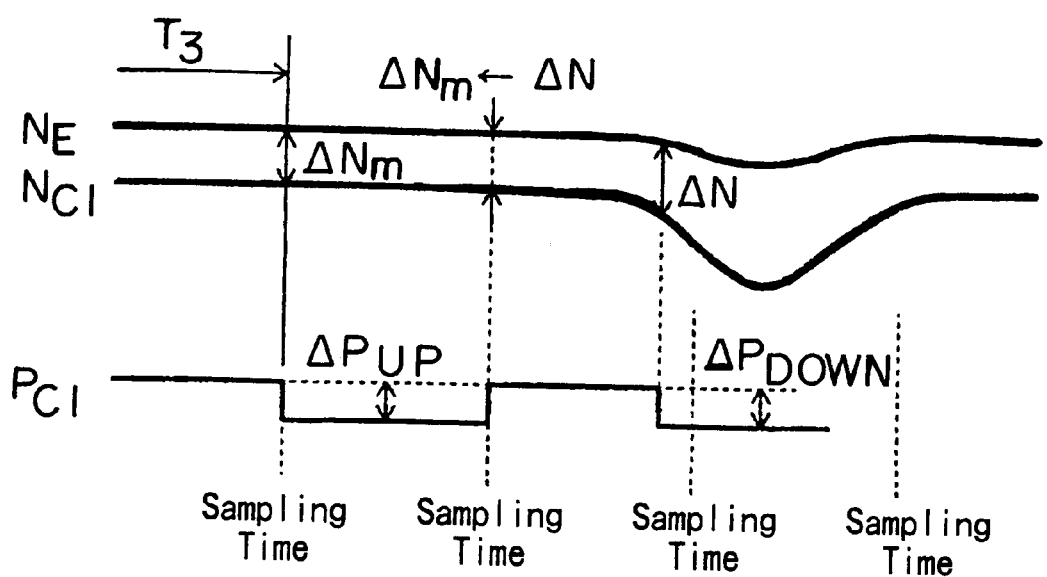
FIG. 15 is a waveform diagram illustrating engine RPM NE, clutch input side RPM $N_{C1}$ and C-1 oil pressure $P_{C1}$ under neutral state control in accordance with the present invention.

The subroutine for the in-neutral control of Step S2 of FIG. 6 will now be described with reference to FIGS. 13–15. In the flow chart for the in-neutral controlling routine of FIGS. 13 and 14:

Step S2-1: An oil pressure control flag F, a counted value C of a counter (not shown), and a reference rotational speed difference $\Delta N_m$ are initialized, as follows:

F ← OFF;

C ← 0; and $\Delta N_m$ ← the value of the rotational speed difference $\Delta N(N_E - N_{C1})$ at that time.

Steps S2-2 & S2-3: The C-1 oil pressure $P_{C1}$ is held at the final value reached in the release control routine. If the decision for whether or not the rotational speed difference $\Delta N$ has changed is started immediately after it has been confirmed that the first clutch C1 is released to a predetermined state, that decision may be erroneous because of the change in the rotational speed difference $\Delta N$ due to the pressure reduction in the release controlling routine. Therefore, the timing is taken by a second timer (not shown) so that the C-1 oil pressure $P_{C1}$ is held until a time $T_2$ has elapsed. Thus, the decision on whether or not the rotational difference $\Delta N$ has changed is delayed so that the C-1 oil pressure $P_{C1}$ can be prevented from being controlled while in the unstable state which immediately follows release of the first clutch C1. When the time $T_2$ has elapsed, the routine advances to Step S2-4.

Step S2-4: The rotational difference calculator 941 (of FIG. 1) calculates the rotational speed difference $\Delta N$ between the engine RPM $N_E$ and the clutch input side RPM $N_{C1}$.

Step S2-5: It is decided whether or not a preset sampling time, e.g., 1.0 sec or 0.5 sec has elapsed. The routine advances to Step S2-6, when the sample time has elapsed, but to Step S2-12 if the sample time has not elapsed.

Step S2-6: It is decided whether or not the absolute value of the difference between the calculated rotational speed difference $\Delta N$ and the reference rotational speed difference $\Delta Nm$ exceeds a set value $\Delta N_R$, that is, whether or not the variation of the rotational speed difference $\Delta N$ exceeds the set value $\Delta N_R$. The routine advances to Step S2-7, when the variation of the rotational difference $\Delta N$ is no more than the set value $\Delta N_R$, but to Step S2-9 when it does exceed the set value $\Delta N_R$. The set value $\Delta N_R$ is preset for discriminating between the drag region and the slip region of FIG. 12.

It may be erroneously decided that the rotational speed difference has changed when calculated, if a detection error or a calculation error occurs in the engine RPM sensor 49 or the RPM sensor 47. Given that the rotational speed difference $\Delta N$ abruptly changes if the application of the first clutch C1 is started immediately before the calculation is made, therefore, error in determination of a change in the rotational speed difference $\Delta N$ can be prevented by deciding that the rotational difference $\Delta N$ has changed only when the change exceeds the set value $\Delta N_R$.

When the set value $\Delta N_R$ is changed with the oil temperature, the C-1 oil pressure $P_{C1}$ can be satisfactorily controlled over a range from the low temperature to the high temperature of the oil.

Step S2-7: It is decided whether or not the counted value C of the counter is smaller than a set value CR. The routine advances to Step S2-8, when the counted value C is smaller than the set value CR, but to Step S2-15 when larger than the set value CR.

Step S2-8: Because of no change in the rotational speed difference $\Delta N$, it is decided that the first clutch C1 is in the drag region. Since the piston of the C-1 servo may have been returned too far in this state, the in-neutral control oil pressure changer 945 raises the C-1 oil pressure $P_{C1}$ by a second set pressure $\Delta P_{UP}$ of a predetermined oil pressure increment, as illustrated in FIG. 15:

$P_{C1} \leftarrow {}_{PC1} + \Delta P_{UP}$.

Moreover, the reference rotational speed difference $\Delta N_m$ is reset to the rotational difference $\Delta N$, and the oil pressure control flag F is set ON:

$\Delta N_m \leftarrow \Delta N$; and $F \leftarrow ON$.

Step S2-9: It is decided whether or not the change in the rotational speed difference $\Delta N$ is tending lower, that is, whether or not the difference between the rotational speed difference $\Delta N$ and the reference rotational difference $\Delta N_m$ is no more than the set value $\Delta N_R$. The routine advances to Step S2-11, when the difference between the rotational difference $\Delta N$ and the reference rotational difference $\Delta N_m$ is no more than the set value $\Delta N_R$, but to Step S2-10 when more than the set value $\Delta N_R$.

Step S2-10: Since it is possible to decide that the first clutch C1 is transferring from the drag region to the slip region, the in-neutral control oil pressure changer 945 reduces the C-1 oil pressure $P_{C1}$ by a third set pressure $\Delta P_{DOWN}$ of a predetermined oil pressure increment, as illustrated in FIG. 15. Here, the second set pressure $\Delta P_{UP}$ and the third set pressure $\Delta P_{DOWN}$ are equalized:

$P_{C1} \leftarrow {}_{PC1} - \Delta P_{DOWN}$.

The rotational difference $\Delta N$ is set as the reference rotational difference $\Delta N_m$, and the oil pressure control flag F is set OFF. At the same time, the value "1" is subtracted from the counted value C of the counter. Moreover, the C-1 oil pressure $P_{C1}$ at this time is set as the reference C-1 oil pressure $P_{C1}$:

$\Delta N_m \leftarrow \Delta N$;

$F \leftarrow OFF$;

$C \leftarrow C-1$ (wherein C=0 for C<0); and $P_{C1m} \leftarrow P_{C1}$.

Step S2-11: Since it is possible to decide that the first clutch C1 is transferring from the slip region to the drag region, the C-1 oil pressure $P_{C1}$ is held at the value of that time, and the oil pressure control flag F is set OFF:

$F \leftarrow OFF$.

Specifically, the rotational speed difference $\Delta N$ decreases while the first clutch C1 is transferring from the slip region to the drag region. If the C-1 oil pressure $P_{C1}$ is further lowered at this time, the C-1 servo piston may be abruptly retracted to cause an excessive stroke loss. During the transfer of the first clutch C1 from the slip region to the drag region, therefore, the C-1 oil pressure $P_{C1}$ is held at the prevailing level by once inhibiting its reduction (skipping a reduction for one sampling period).

Step S2-12: It is decided whether or not the oil pressure control flag F is ON, that is, whether or not the C-1 oil pressure $P_{C1}$ was raised at the preceding sampling time. The routine advances to Step S2-1, when the oil pressure control valve F is ON, but to Step S2-15 when OFF.

Step S2-13: Since the C-1 oil pressure $P_{C1}$ was raised at the preceding sampling time, it is decided whether or not the difference between the rotational speed difference $\Delta N$ from the reference rotational speed difference $\Delta N_m$ exceeds the set value $\Delta N_R$. The routine advances to Step S2-14, when the difference between the rotational speed difference $\Delta N$ and the reference rotational difference $\Delta N_m$ does not exceed the set value $\Delta N$, but to Step S2-15 when it does exceed the set value $\Delta N_R$.

Step S2-14: Since the C-1 oil pressure $P_{C1}$ was raised at the preceding sampling time, the rotational speed difference $\Delta N$ has varied. It is, therefore, decided that the first clutch C1 is in the slip region, and the in-neutral control oil pressure changer 945 lowers the C-1 oil pressure $P_{C1}$ by the third set pressure $\Delta P_{DOWN}$ of a predetermined oil pressure increment:

$P_{C1} \leftarrow {}_{PC1} - \Delta P_{DOWN}$.

The rotational difference $\Delta N$ is set as the reference rotational difference $\Delta N$ and the oil pressure control flag F is set OFF. At the same time, the value "1" is subtracted from the counted value C of the counter. As at the Step S2-10, the C-1 oil pressure $P_{C1}$ at this time is set as the reference C-1 oil pressure $P_{C1m}$:

$\Delta N_m \leftarrow \Delta N$;

$F \leftarrow OFF$;

$C \leftarrow C+1$; and $P_{C1m} \leftarrow P_{C1}$.

As described before, it is decided at each sampling time whether or not the rotational speed difference $\Delta N$ has changed. When this decision reveals that the C-1 oil pressure $P_{C1}$ has risen, the first clutch C1 may start to be applied and may enter into the slip region, by which the transmission of the torque Tq may be started to generate idle vibration. Therefore, when the rotational speed difference $\Delta N$ changes in the direction of increase while the first clutch C1 starts to be applied, the C-1 oil pressure $P_{C1}$ is lowered without awaiting the subsequent sampling time. Thus, the first clutch C1 can be prevented from entering into the slip region, to thereby prevent the idle vibration.

As described above, on the other hand, the C-1 oil pressure $P_{C1}$ is changed at the sampling time only when the change in the rotational speed difference $\Delta N$ is higher than the set value $\Delta N_R$. If, in this case, the rotational speed difference $\Delta N$ changes by a small amount, for example, a change of the C-1 oil pressure $P_{C1}$ may not be effected, even though the first clutch C1 has entered into the slip region. By updating the reference rotational difference $\Delta N_m$ only at the time of a change in the C-1 oil pressure $P_{C1}$, therefore, the C-1 oil pressure $P_{C1}$ can be changed without fail even when the rotational difference $\Delta N$ changes little by little so that the first clutch C1 enters into the slip region.

Step S2-15: It is decided whether or not the condition for ending the neutral state control of the first clutch C1 is satisfied. The routine is ended when the neutral state ending condition is satisfied, but is returned to Step S2-4 when the ending condition is not satisfied, to repeat the aforementioned operations.

Figure 16:
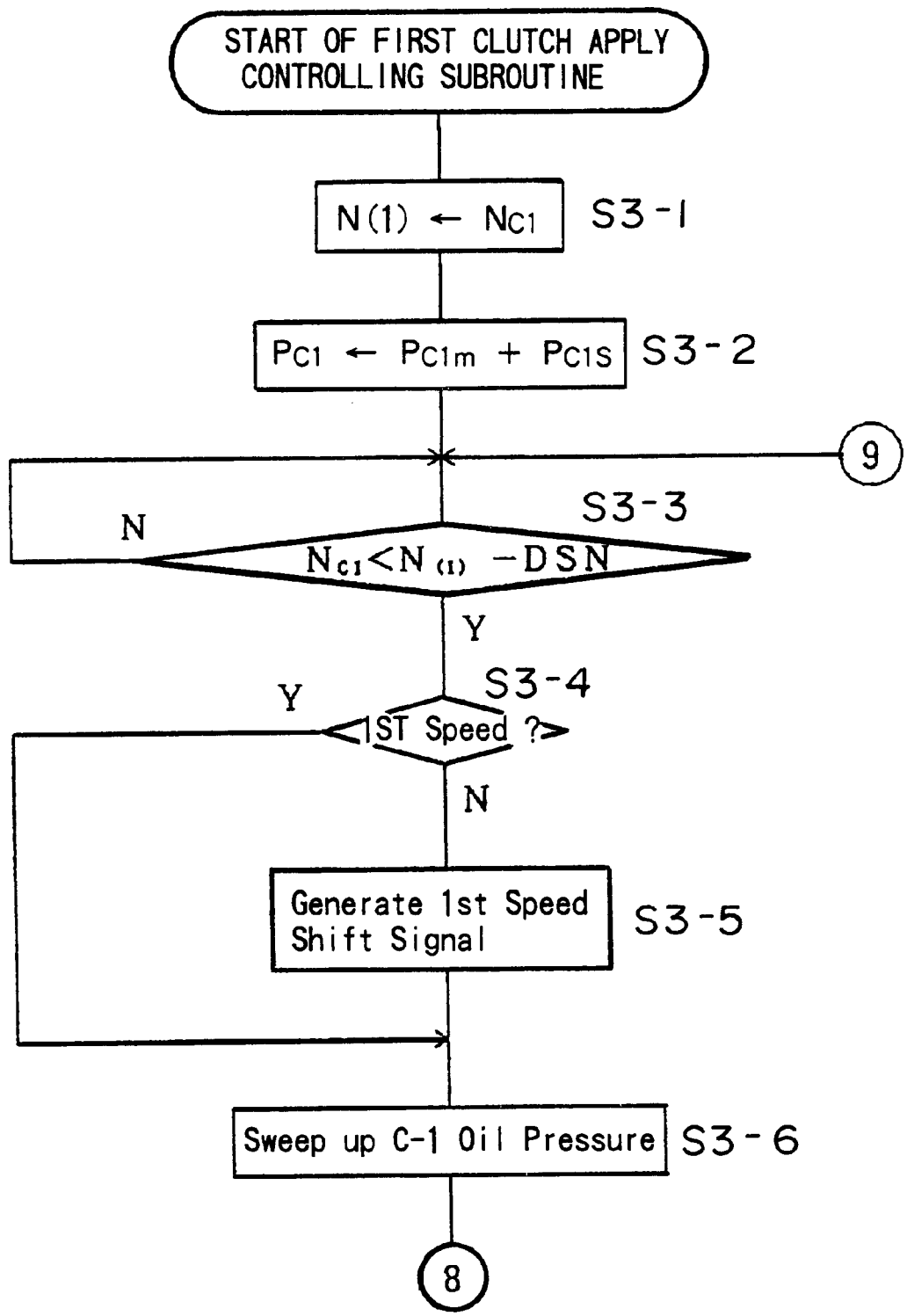
FIG. 16 is a partial flow chart of a first clutch apply controlling routine executed by the control system shown in FIG. 1.
Figure 17:
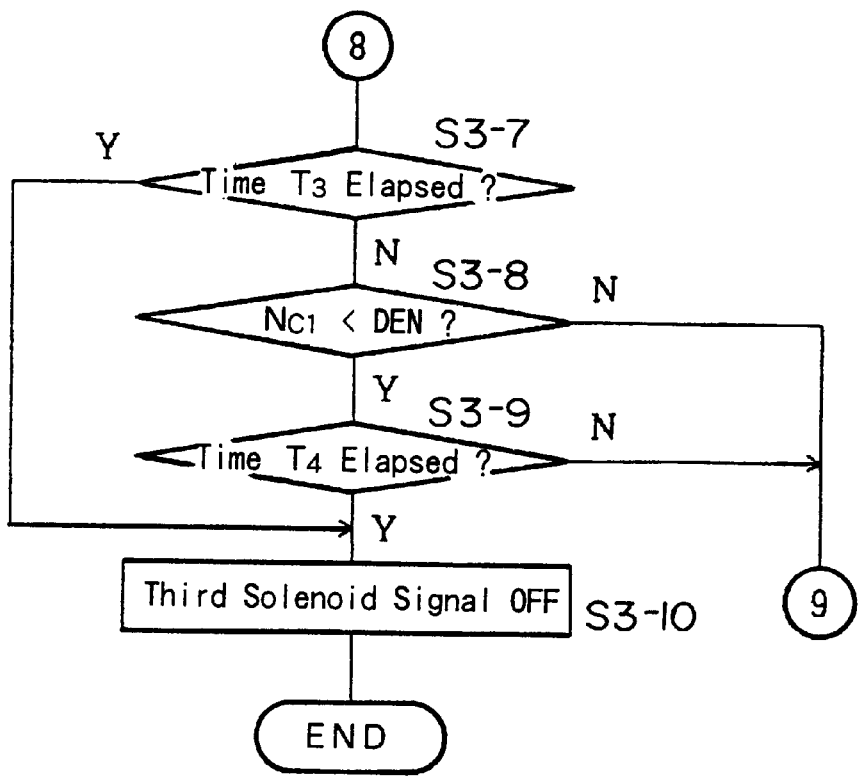
FIG. 17 is a flow chart of the remainder of the first clutch apply controlling routine shown in part in FIG. 6.
Figure 18:
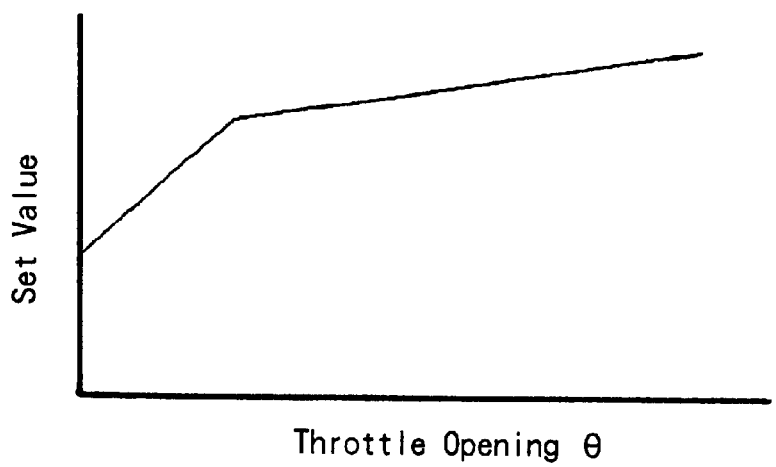
FIG. 18 is a graph of a set value for pressure versus throttle opening in an embodiment of the present invention.

The subroutine of the first clutch apply controlling routine of Step 3 of FIG. 6 will now be described with reference to FIGS. 16–18. FIGS. 16 and 17 depict a flow chart of the first clutch apply controlling routine. FIG. 18 serves to illustrate the relationship between a throttle opening and a set value in an embodiment of the present invention. In FIG. 18, the abscissa indicates the throttle opening $\theta$ and the ordinate indicates the set value such as the constant $P_{C1S}$, the pressure $P_B$ or the set pressure $\Delta P_B$. In the flow chart of FIGS. 16 and 17:

Step S3-1: The clutch input side RPM $N_{C1}$, at the instant when the condition for ending the in-neutral control is satisfied, is stored as a value N(1) in the memory of the automatic transmission control system 41 (of FIG. 2). Simultaneously with this, the timing of a third timer (not shown) is started.

Step S3-2: A constant $P_{C1S}$ is added as a shelf pressure to the reference C-1 oil pressure $P_{C1m}$, as set in Step S2-10, and the sum is set as the C-1 oil pressure $P_{C1}$. The constant $P_{C1S}$ is set so as to move the piston of the hydraulic servo C-1 (of FIG. 5) without fail and to reduce application shock.

When the driver performs a starting operation so that a shift from the stop state to the start state of the vehicle is detected, the constant $P_{C1S}$ is added to the reference C-1 oil pressure $P_{C1m}$ so that the oil pressure fed to the hydraulic servo C-1 is raised to bring the first clutch C1 into a partially applied state. Subsequently, the oil pressure applied to the hydraulic servo C-1 is further raised to bring the first clutch C1 into the completely applied state.

Step S3-3: The routine waits until the clutch input side RPM $N_{C1}$ becomes smaller than the difference obtained by subtracting the value N(1) from a constant DSN. When the clutch input side RPM $N_{C1}$ is smaller than that difference, the start of application of the first clutch C1 is decided, and the routine advances to Step S3-4.

Step S3-4: It is decided whether or not the gear stage is at the 1ST speed. The routine advances to Step S3-6, when the gear stage is at the 1ST speed, but to Step S3-5 when not at the 1ST speed.

Step S3-5: The 1ST speed shift signal is generated.

Figure 7:
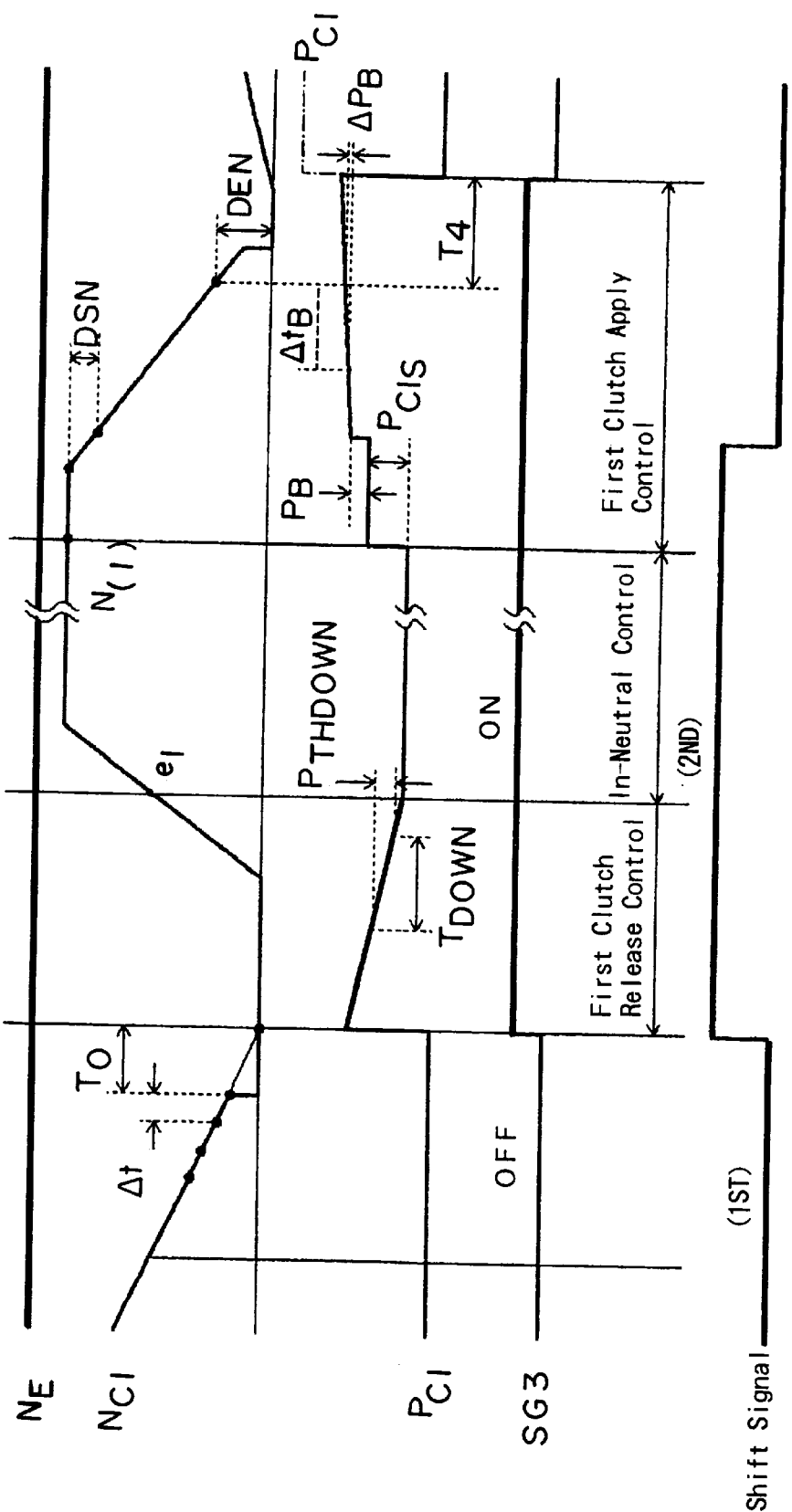
FIG. 7 is a time chart for the neutral control routine of FIG. 6.

Step S3-6: The throttle pressure $P_{TH}$ from the linear solenoid valve 66 (of FIG. 4) is changed, and the C-1 oil pressure $P_{C1}$ is set to the pressure $P_B$ and then swept up. After this, the C-1 oil pressure $P_{C1}$ is raised by the set pressure $\Delta P_B$ every lapse of time interval $\Delta t_B$ (of FIG. 7) to continue the application of the first clutch C1.

Step S3-7: It is decided whether or not the time $T_3$ clocked by the third timer has elapsed. The routine advances to Step S3-10, when the time $T_3$ has elapsed, but to Step S3-8 when the time $T_3$ has not elapsed.

Step S3-8: It is decided whether or not the clutch input side RPM $N_{C1}$ is smaller than a constant DEN. The routine advances to Step S3-9, when the clutch input side RPM $N_{C1}$ is smaller than the constant DEN, but is returned to Step S3-3 when larger than the constant DEN. Here, when it is decided that the clutch input side RPM $N_{C1}$ is smaller than the constant DEN, a fourth timer (not shown) starts its timing operation.

Step S3-9: It is decided whether or not a time $T_4$, as measured by the fourth timer, has elapsed. The routine advances to Step S3-10, when the time $T_4$ has elapsed, but is returned to Step S3-3 when the time $T_4$ has not elapsed.

In this case, the set value such as the constant $P_{C1S}$, the pressure $P_B$ or the set pressure $\Delta P_B$ are set on the basis of a variable corresponding to the input torque $T_T$, such as the throttle opening $\theta$.

Step S3-10: The third solenoid signal SG3 is turned OFF.

Figure 19:
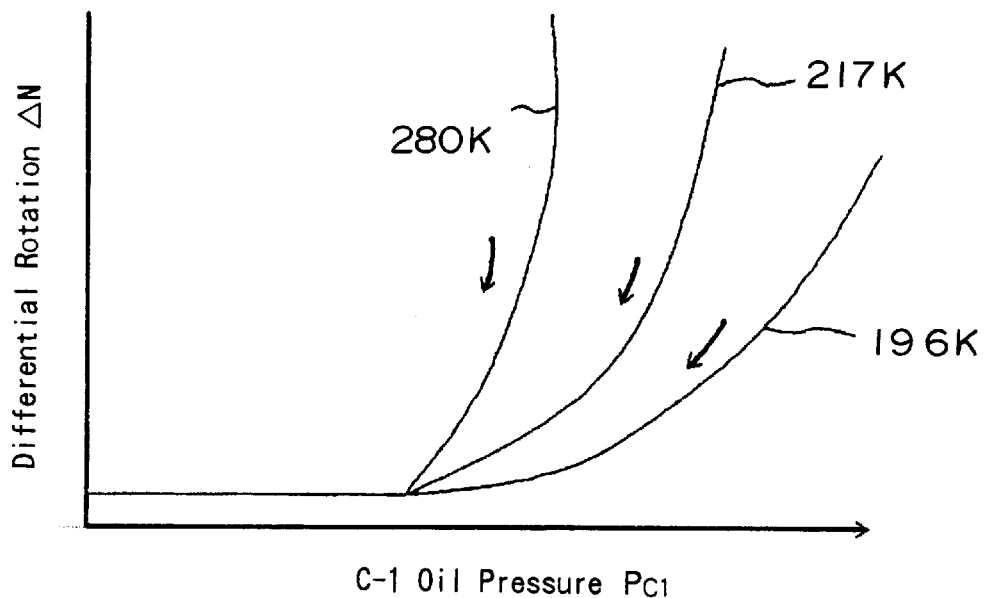
FIG. 19 is a graph of rotational speed difference AN across a torque converter (T/C) versus C-1 oil pressure for various (T/C) stall capacity coefficients, in an embodiment of the invention.

The relationship among the stall capacity coefficient, the oil temperature, the C-1 oil pressure $P_{C1}$ and the rotational difference $\Delta N$ of the torque converter 12 will now be described with reference to FIGS. 19 and 20 wherein the abscissa indicates the C-1 oil pressure $P_{C1}$ and the ordinate indicates the rotational difference $\Delta N$.

As the stall capacity coefficient of the torque converter 12 (of FIG. 2) grows larger so that the stall torque becomes larger, the movement of the piston of the hydraulic servo C-1 becomes greater for any given change in the C-1 oil pressure $P_{C1}$, so that the change in the rotational speed difference $\Delta N$ becomes larger. Here, 196K, 217K and 280K are the stall capacity coefficients of the torque converter 12.

Figure 20:
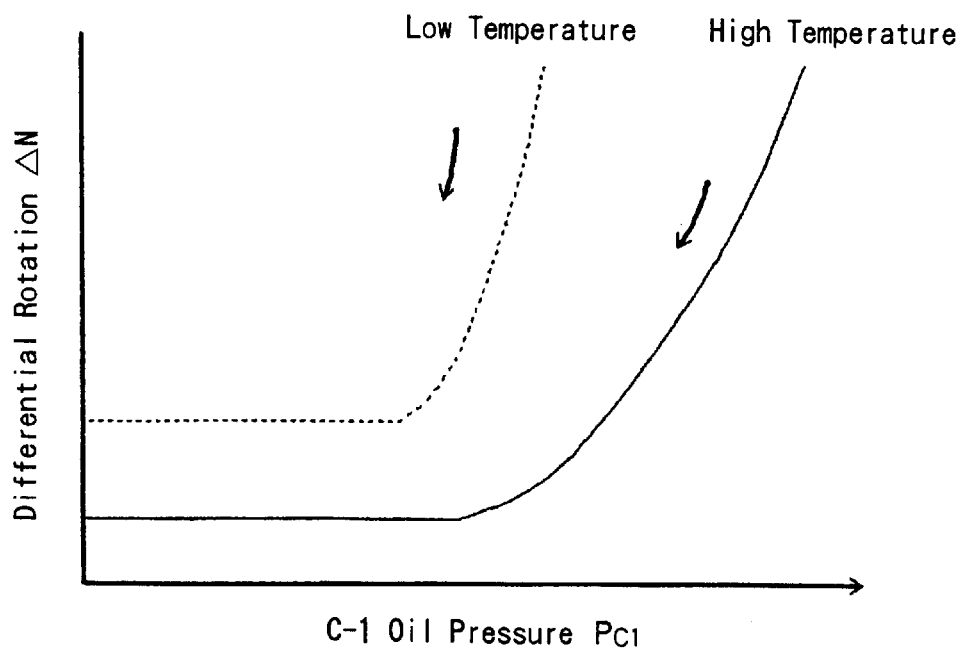
FIG. 20 is a graph of rotational speed difference AN of the torque converter versus C-1 oil pressure, for both a high temperature and a low temperature in an embodiment of the present invention.

As the oil temperature drops, as illustrated in FIG. 20, the movement of the piston of the hydraulic servo C-1 (of FIG. 5) becomes larger for any given change in the C-1 oil pressure $P_{C1}$ so that changes in the rotational speed difference $\Delta N$ become greater.

A vehicle having an engine of small displacement generally has a low engine torque so that it uses a torque converter 12 having an accordingly higher stall capacity coefficient. In the case of a torque converter 12 having a high stall capacity coefficient and high stall torque, the change in the rotational speed difference $\Delta N$ is excessively large, if the first set pressure $P_{THDOWN}$ (of FIG. 7) is raised, so that the first clutch C1 is released too far to allow the release control to stabilize.

In the present embodiment, therefore, the first set pressure increment $P_{THDOWN}$ is set at a low level.

In the case of the torque converter 12 having a high stall capacity coefficient and a high stall torque, moreover, the change in the rotational speed difference $\Delta N$ at a low oil temperature is excessively small, if the second set pressure $\Delta P_{UP}$ (of FIG. 15) and the third set pressure $\Delta P_{DOWN}$ are reduced. As a result, the state immediately before the start of the application of the first clutch C1 cannot be restored and stable in-neutral control cannot be executed.

Thus, the second set pressure $\Delta P_{UP}$ and the third set pressure $\Delta P_{DOWN}$ are made greater than the first set pressure $P_{THDOWN}$.

FIG. 21 is a waveform diagram of the engine RPM, the clutch input side RPM and the C-1 oil pressure in an embodiment of the present invention. When the first set pressure $P_{THDOWN}$ is set at a low level, as illustrated in FIG. 21, the rise of the clutch input side RPM $N_{C1}$ in the release control can be made gentle. As a result, the first clutch C1 is not excessively released so that the release control can be stabilized independently of the stall capacity coefficient of the torque converter 12.

Moreover, the second set pressure $\Delta P_{UP}$ and the third set pressure $\Delta P_{DOWN}$ can be made greater than the first set pressure $P_{THDOWN}$ so that the value of the rotational speed difference $\Delta N$ in the in-neutral control can be stabilized. As a result, the first clutch C1 can be returned to the state which immediately precedes the application of the first clutch C1, so that the in-neutral control can be stabilized independently of the stall capacity coefficient of the torque converter 12.

The second set pressure $\Delta P_{UP}$ and the third set pressure $\Delta P_{DOWN}$ are equalized in the present embodiment, but the second set pressure $\Delta P_{UP}$ can be greater than the third set pressure $\Delta P_{DOWN}$. In the in-neutral control, moreover, the oil pressure increment for raising the C-1 oil pressure $P_{C1}$ is enlarged when the rotational speed difference $\Delta N$ is unchanged, but the oil pressure increment for lowering the C-1 oil pressure $P_{C1}$ is reduced as the rotational difference $\Delta N$ changes.

As a result, the first clutch C1 can be reliably returned to the state which immediately precedes its application so that the in-neutral control can be stabilized independently of the stall capacity coefficient of the torque converter 12.

On the other hand, the second set pressure $\Delta P_{UP}$ and the third set pressure $\Delta P_{DOWN}$ can be varied according to the oil temperature. In this case, the responsiveness of the change in the rotational speed difference $\Delta N$ to the change in the C-1 oil pressure $P_{C1}$ can be improved, if the second set pressure $\Delta P_{UP}$ and the third set pressure $\Delta P_{DOWN}$ are varied for ranges of oil temperatures, e.g. ranges of (1) higher than 0° C. and lower than 40° C., (2) at least 40° C. and lower than 60° C., and (3) at least The entire disclosure of Japanese Patent Application No. 8-258883 filed on Sep. 30, 1996 including specification, drawings, and abstract is incorporated herein by reference in its entirety.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission in a vehicle, comprising:

a fluid transmission unit for transmitting rotation of an engine to a speed change unit;

a clutch which is applied responsive to selection of a forward running range, for transmitting rotation output by said fluid transmission unit to the speed change unit;

a hydraulic servo for applying/releasing said clutch;

stop state detecting means for detecting a vehicle stop state in which a forward running range is selected, in which a throttle of the engine is fully closed, in which a brake pedal is depressed and in which speed of the vehicle is substantially zero;

input side RPM detecting means for detecting an input side RPM of said fluid transmission unit;

output side RPM detecting means for detecting an output side RPM of said fluid transmission unit; and a control unit including:

release control oil pressure changing means for lowering oil pressure of said hydraulic servo by a first set pressure increment when the vehicle stop state is detected by said stop state detecting means;

rotational difference calculating means for calculating a rotational speed difference between said detected input side RPM and said detected output side RPM;

rotational difference change deciding means for deciding at each interval of a set time whether or not the rotational speed difference calculated by said rotational difference calculating means has changed from a previously calculated rotational speed difference; and in-neutral control oil pressure changing means for raising the oil pressure of said hydraulic servo by a second set pressure increment, different from said first set pressure increment, when said rotational speed difference has not changed, and for lowering the oil pressure of said hydraulic servo by a third set pressure increment, different from said first set pressure increment, when said rotational speed difference has changed, wherein said second and third set pressure increments are each greater than said first set pressure increment.

2. An automatic transmission control system according to claim 1, wherein said second and third set pressure increments are not equal.

3. An automatic transmission control system according to claim 2, wherein said second and third set pressure increments are set to correspond to oil temperature.

4. A control system for an automatic transmission in a vehicle, comprising:

a fluid transmission unit for transmitting rotation of an engine to a speed change unit;

a clutch which is applied responsive to selection of a forward running range, for transmitting rotation output by said fluid transmission unit to the speed change unit;

a hydraulic servo for applying/releasing said clutch;

stop state detecting means for detecting a vehicle stop state in which a forward running range is selected, in which a throttle of the engine is fully closed, in which a brake pedal is depressed and in which speed of the vehicle is substantially zero;

input side RPM detecting means for detecting an input side RPM of said fluid transmission unit;

output side RPM detecting means for detecting an output side RPM of said fluid transmission unit; and a control unit including:

release control oil pressure changing means for lowering oil pressure of said hydraulic servo by a first set pressure increment when the vehicle stop state is detected by said stop state detecting means;

rotational difference calculating means for calculating a rotational speed difference between said detected input side RPM and said detected output side RPM;

rotational difference change deciding means for deciding at each interval of a set time whether or not the rotational speed difference calculated by said rotational difference calculating means has changed from a previously calculated rotational speed difference; and in-neutral control oil pressure changing means for raising the oil pressure of said hydraulic servo by a second set pressure increment, different from said first set pressure increment, when said rotational speed difference has not changed, and for lowering the oil pressure of said hydraulic servo by a third set pressure increment, different from said first set pressure increment, when said rotational speed difference has changed, wherein said second set pressure increment is larger than said third set pressure increment.

5. An automatic transmission control system according to claim 4, wherein said second and third set pressure increments are set to correspond to oil temperature.

* * * * *

UNITED STATES PATENT AND TRADEMARK OFFICE
CERTIFICATE OF CORRECTION

PATENT NO. : 5,921,884
DATED : July 13, 1999
INVENTOR(S) : NISHIWAKI et al

It is certified that error appears in the above-identified patent and that said Letters Patent is hereby corrected as shown below:

Col. 3, line 60 "AN" should read --$\Delta N$--; and
line 64, "AN" should read --$\Delta N$--.
Col. 9, line 13, "NE" should read --$N_E$--.
Col. 13, line 31, "$P_{C1}$" should read --$P_{C1m}$--.
Col. 16, line 55, after "at least" insert --60°C.-- and begin a new paragraph with "The".

Signed and Sealed this

Seventeenth Day of October, 2000

Attest:

Q. TODD DICKINSON

*Attesting Officer*  *Director of Patents and Trademarks*